United States Patent
Wagatsuma

(10) Patent No.: US 9,667,816 B2
(45) Date of Patent: May 30, 2017

(54) RELAY CONNECTION SYSTEM AND NON-TRANSITORY COMPUTER-READABLE RECORDING MEDIUM

(71) Applicant: KONICA MINOLTA, INC., Tokyo (JP)

(72) Inventor: Yoshifumi Wagatsuma, Koganei (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/947,509

(22) Filed: Nov. 20, 2015

(65) Prior Publication Data
US 2016/0150104 A1 May 26, 2016

(30) Foreign Application Priority Data
Nov. 21, 2014 (JP) ................. 2014-236815

(51) Int. Cl.
*H04N 1/04* (2006.01)
*H04N 1/00* (2006.01)
*G06F 3/12* (2006.01)

(52) U.S. Cl.
CPC ....... *H04N 1/00244* (2013.01); *G06F 3/1205* (2013.01); *G06F 3/1285* (2013.01); *G06F 3/1292* (2013.01); *G06F 3/1294* (2013.01); *H04N 1/00307* (2013.01); *H04N 2201/0094* (2013.01)

(58) Field of Classification Search
CPC ........... H04N 1/00244; H04N 1/00307; H04N 2201/0094
USPC ........................................ 358/1.15, 1.9, 474
See application file for complete search history.

(56) References Cited

U.S. PATENT DOCUMENTS

| 7,925,705 | B2 * | 4/2011 | Ishimoto | G06F 3/1206 709/206 |
| 2006/0221863 | A1 * | 10/2006 | Ishimoto | G06F 3/1206 370/254 |
| 2007/0122062 | A1 * | 5/2007 | Jacobs | G06K 9/00993 382/305 |

FOREIGN PATENT DOCUMENTS

| JP | 2012037919 A | 2/2012 |
| JP | 2013081248 A | 5/2013 |
| JP | 2013120501 A | 6/2013 |
| JP | 2013156994 A | 8/2013 |

* cited by examiner

*Primary Examiner* — Houshang Safaipour
(74) *Attorney, Agent, or Firm* — Baker & Hostetler LLP

(57) ABSTRACT

Disclosed is a relay connection system including: a server; one or more job processing devices; and a terminal device, wherein each job processing device blinks the light emitting unit in accordance with each blinking pattern, the terminal device recognizes the blinking pattern of the light emitting unit by shooting the job processing device, and transmits a connection request including the recognized blinking pattern and an address of the terminal device, to the server, the server registers an address of the job processing device and the blinking pattern of the job processing device, in case that the server receives the connection request, the server checks whether a coincident blinking pattern which is coincident with the blinking pattern included in the connection request is registered, and in case that the coincident blinking pattern is registered, the server relays the communication between the terminal device and the job processing device.

33 Claims, 16 Drawing Sheets

FIG.5

| APPARATUS ID | APPARATUS IP ADDRESS | BLINKING PATTERN | BLINKING STATUS | APPARATUS STATUS | CONNECTION FREQUENCY | TERMINAL IP ADDRESS |
|---|---|---|---|---|---|---|
| MFP1 | 196.11.23.170 | 10110101 | - | - | 3 4 | 196.11.23.050 |
| MFP2 | 196.11.23.180 | 11001010 | - | OUT OF TONER | 5 6 | - |
| MFP3 | 196.11.23.200 | 10101101 | ABNORMAL | - | 4 2 | - |
| MFP4 | 196.11.23.168 | 11011011 | - | - | - | - |
| MFP5 | 196.11.23.183 | 10111101 | - | - | 1 2 | - |
| MFP(N) | 196.11.23.154 | 11100110 | - | - | 8 0 | 196.11.23.040 |

50

RELAY CONNECTION SYSTEM AND NON-TRANSITORY COMPUTER-READABLE RECORDING MEDIUM

CROSS-REFERENCE TO RELATED APPLICATIONS

The present U.S. patent application claims the priority of Japanese Patent Application No. 2014-236815, filed on Nov. 21, 2014, according to the Paris Convention, and the entirety of which is incorporated herein by reference for correction of incorrect translation.

BACKGROUND OF THE INVENTION

Field of the Invention

The present invention relates to a relay connection system for relaying the communication between a terminal device and a job processing device via a server and a non-transitory computer-readable recording medium for storing a program used in the server.

Description of Related Art

In an electric apparatus, such as an image forming apparatus or the like, for example, the function thereof is expanded by linking the apparatus with a terminal device, such as a smart device including a smart phone and a tablet. Therefore, the convenience thereof is improved. In general, the connection using the network is used for the connection between the above two apparatuses. By using the network communication, in addition to the wired communication, the wireless communication is available. The wireless communication gives the high convenience to a user because the wireless communication does not depend on the length of a cable or the place in which the cable is arranged.

However, in order to use the wireless communication, each electric apparatus is required to recognize the IP (Internet Protocol) addresses which are the addresses of the other electric apparatuses on the network. In general, a user checks the IP address of the apparatus which is the transmission destination, and manually and directly inputs the checked IP address to the apparatus which is the transmission source. This work is difficult and inconvenience for a user who is inexperienced in the operation of the electric apparatus and who does not have the knowledge of the IP address. Therefore, various types of methods for relieving the troublesome work have been proposed.

For example, in the print system disclosed in Japanese Patent Application Publication No. 2013-120501, the positional information obtained by using the GPS (Global Positioning System) is sent from a terminal device and each image forming apparatus to a server. The server checks the positional information, identifies the image forming apparatus which exists in the image shot by a camera of the terminal device and sends the information indicating the operating status of the image forming apparatus and the like, to the terminal device. The terminal device displays the operating status so as to overlap it with the image forming apparatus on the image. In the terminal device, when a user selects the image forming apparatus in the image and carries out the print instruction for the image forming apparatus, the print data is automatically sent to the selected image forming apparatus via the server.

Further, the following print system has been proposed. In the print system, when a user inputs a print request via a panel of a printer, the printer displays or prints the graphical code and sends it to the server. When the user sends the graphical code shot by a smart device and the print data to the server, the server sends the print data to the printer which sends the graphical code which is coincident with the shot graphical code, and instructs the printer to print the image (See Japanese Patent Application Publication No. 2013-156994).

In the print system disclosed in Japanese Patent Application Publication No. 2013-120501, because the image forming apparatus which is in the shot image of the terminal device is identified in accordance with the positional information obtained by the GPS, each image forming apparatus cannot be precisely identified in case that a plurality of image forming apparatuses are arranged so as to be adjacent to each other or in case that a plurality of image forming apparatuses are three-dimensionally arranged.

In the print system disclosed in Japanese Patent Application Publication No. 2013-156994, it is necessary to input the print request via the operation panel of the printer. Further, in order to correctly scan the contents of the displayed or printed graphical code, it is necessary to shoot the graphical code from a short distance. As a result, a user cannot instruct the printer to print the image away from the printer. Therefore, the advantage of the wireless communication which can remotely control the printer cannot be taken.

SUMMARY

To achieve at least one of the abovementioned objects, a relay connection system reflecting one aspect of the present invention, comprises:

a server connected to a network;

one or more job processing devices connected to the network; and a terminal device connected to the network, wherein the server relays a communication between the terminal device and at least one of the job processing devices, each of the job processing devices comprises a light emitting unit and blinks the light emitting unit in accordance with a different blinking pattern from another job processing device, the terminal device recognizes the blinking pattern of the light emitting unit of the job processing device by shooting the job processing device, and transmits a connection request including the recognized blinking pattern and an address of the terminal device on the network, to the server, the server registers an address of each job processing device on the network and the blinking pattern of each job processing device so as to relate the address of the job processing device to the blinking pattern of the job processing device, in case that the server receives the connection request from the terminal device, the server checks whether a coincident blinking pattern which is coincident with the blinking pattern included in the connection request is registered, and in case that the coincident blinking pattern is registered, the server carries out a connection setting in which the address of the terminal device on the network, which is included in the received connection request is stored so as to relate the address of the terminal device on the network to the address of the job processing device on the network, which is registered so as to be related to the coincident blinking pattern, and relays the communication between the terminal device and the job processing device in which the address of the terminal device and the address of the job processing device are related by the connection setting.

Preferably, the server registers the address of each of a plurality of job processing devices on the network and the blinking pattern of each of the plurality of job processing devices so as to relate the address of the job processing device to the blinking pattern of the job processing device.

Preferably, the server transmits the blinking pattern assigned to each job processing device, to the job processing device, and the job processing device blinks the light emitting unit in accordance with the blinking pattern which is received from the server.

Preferably, the server invalidates the connection setting after a predetermined time elapses.

Preferably, when the server relays the communication, the server temporarily stores data received from a relay source in a relay data storing unit, and transmits the data to a relay destination by reading out the data from the relay data storing unit.

Preferably, the server enables the relay data storing unit to temporarily store a plurality of data, and transmits the data to the relay destination by sequentially reading out the data from the relay data storing unit in an order in which the data are temporarily stored.

Preferably, when a plurality of job processing devices in which the light emitting units blinks, are simultaneously shot, the terminal device receives an operation for selecting one job processing device among the plurality of job processing devices from a user, and recognizes the blinking pattern of the light emitting unit of the selected job processing device.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 5 is a view showing an example of the collation table;

DETAILED DESCRIPTION OF PREFERRED EMBODIMENT

Hereinafter, a preferred embodiment of the present invention will be explained with reference to the accompanying drawings.

Figure 1:
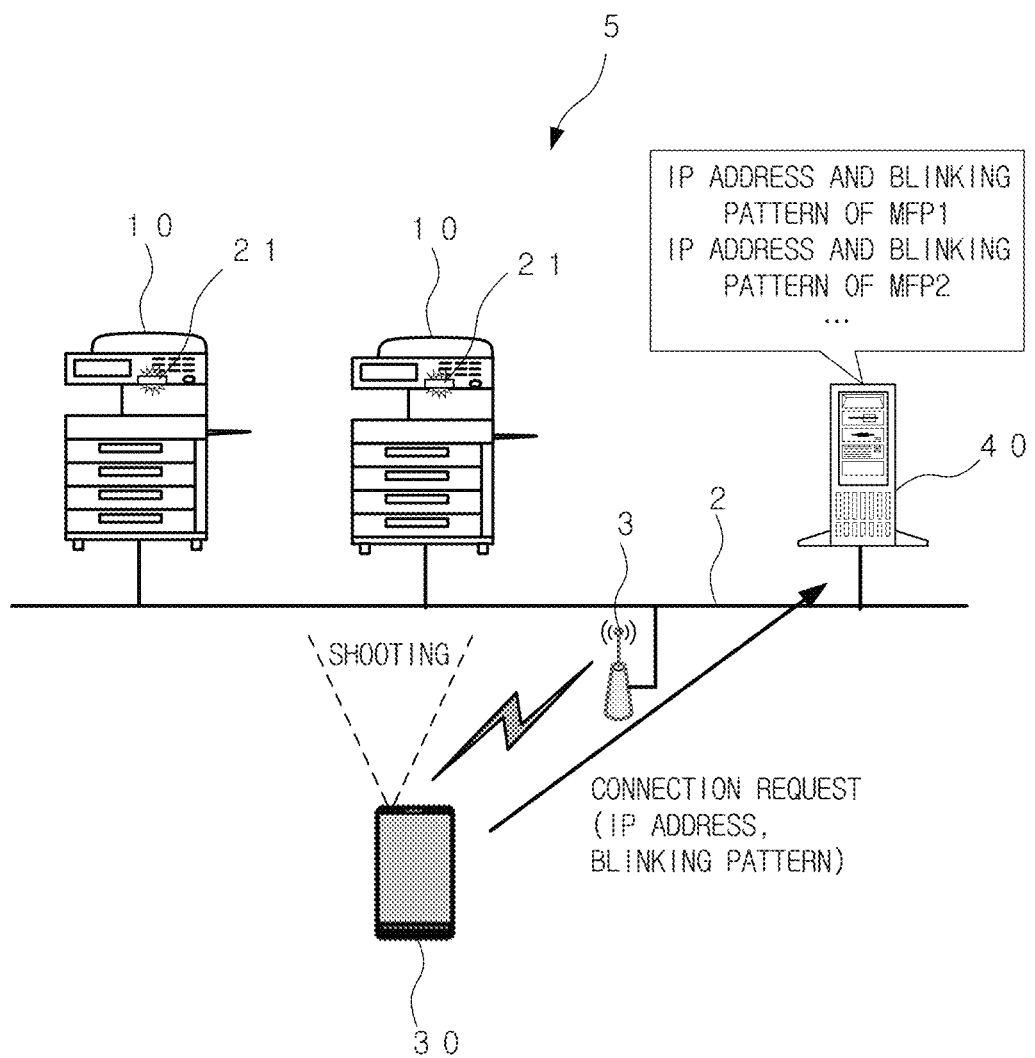
FIG. 1 is a view showing an example of the configuration of the relay connection system according to the embodiment.

FIG. 1 shows an example of the relay connection system 5 according to the embodiment. The relay connection system 5 comprises at least one image forming apparatus 10, a portable terminal 30 and a server 40 which are connected with each other via a network 2, such as a LAN (Local Area Network) or the like. The portable terminal 30 is connected with the network 2 by the wireless communication via an access point 3. In the relay connection system 5, a plurality of image forming apparatuses 10 and/or a plurality of portable terminals 30 may be provided.

The image forming apparatus 10 (hereinafter, also referred to as "MFP") is a job processing device having the function of executing various types of jobs, such as a copy job for printing out an image on a recording sheet by optically reading an original, a scan job for storing the image data of the read original as a file or transmitting the file to an external terminal via the network 2, a print job for printing out a document or an image on a recording sheet in accordance with the print data received from the server 40 via the network 2, and the like.

The image forming apparatus 10 comprises a light emitting unit 21 which is configured by a light emitting element, such as LED (Light Emitting Diode). Each image forming apparatus 10 always blinks the light emitting unit 21 in a different pattern from the other image forming apparatuses 10 when the image forming apparatus 10 is powered on or after the image forming apparatus 10 is communicable with the server 40.

Figure 3:
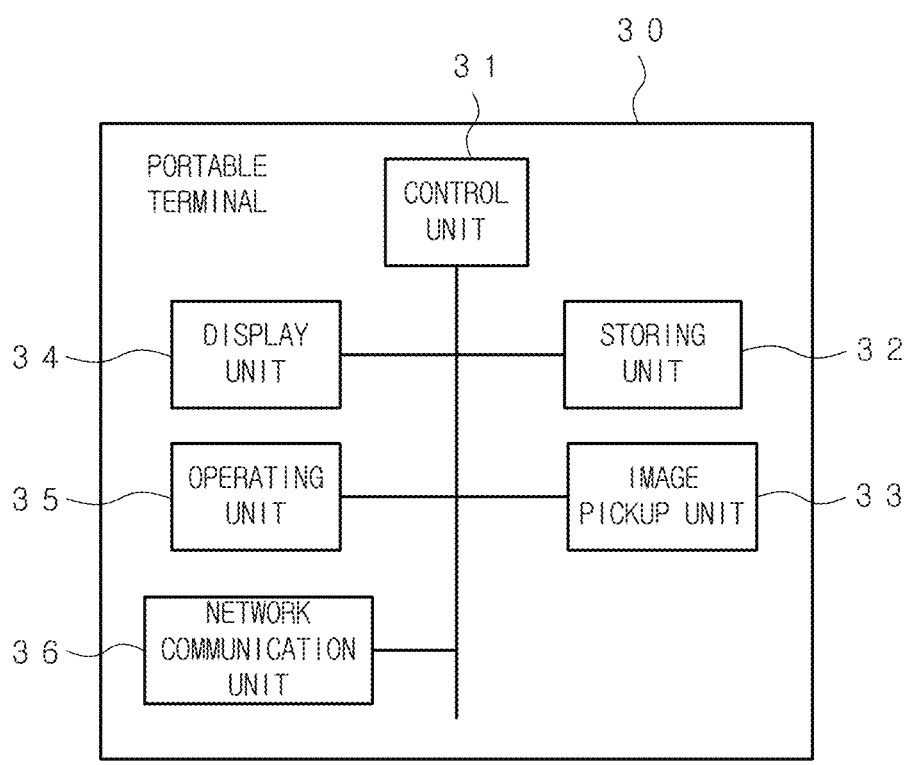
FIG. 3 is a block diagram showing the schematic configuration of the portable terminal.

The portable terminal 30 is a small information processing terminal comprising a camera (image pickup unit 33, See FIG. 3). The portable terminal 30 analyzes the image shot by the image pickup unit 33 and recognizes the blinking pattern of the light emitting unit 21 of the image forming apparatus 10 which is in the shot image. Then, the portable terminal 30 transmits the connection request including the recognized blinking pattern and the address of the portable terminal 30 itself on the network, to the server 40. Hereinafter, the address on the network is explained as the IP address.

In the server 40, the blinking pattern and the IP address of each image forming apparatus 10 are registered so as to relate them. That is, the server 40 can previously manage a group of the image forming apparatuses 10 as a group, and registers the blinking pattern and the IP address of each of the image forming apparatuses 10 which are included in the group, so as to relate them. When the server 40 receives the connection request from the portable terminal 30, the server 40 compares the blinking pattern included in the connection request with each registered blinking pattern. In case that the blinking pattern which is coincident with the blinking pattern included in the connection request is registered, the server 40 carries out the connection setting in which the IP address of the portable terminal 30, which is included in the connection request, is stored so as to be related to the IP address of the image forming apparatus 10, which is related to the coincident blinking pattern. Then, the server 40 relays the communication between the portable terminal 30 and the image forming apparatus 10 in which the IP addresses are related by the valid connection setting.

Figure 2:
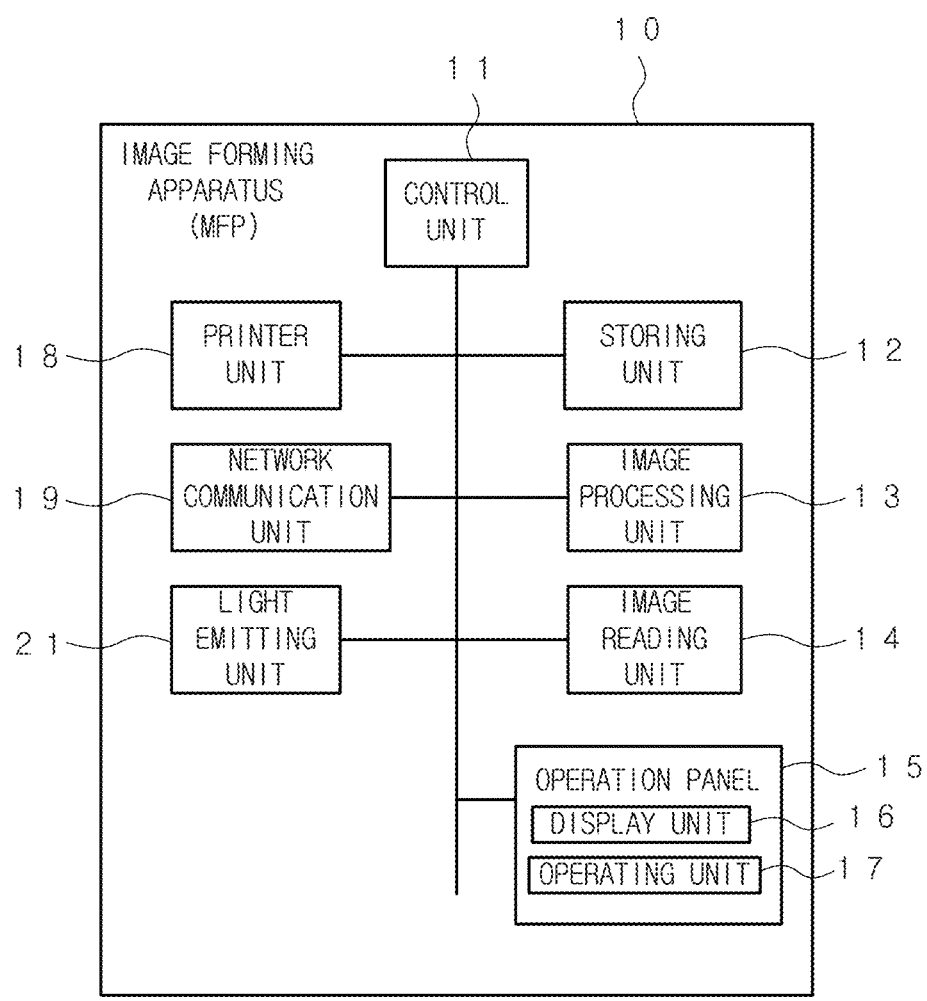
FIG. 2 is a block diagram showing the schematic configuration of the image forming apparatus.

FIG. 2 is a block diagram showing the schematic configuration of the image forming apparatus 10. The image forming apparatus 10 comprises a control unit 11 for entirely controlling the operation of the image forming apparatus 10. The control unit 11 is configured by a CPU (Central Processing Unit) and the like as a main part. The control unit 11 is connected with a storing unit 12, an image processing unit 13, an image reading unit 14, an operation panel 15, a printer unit 18, a network communication unit 19 and the like.

By the CPU of the control unit 11, a middleware, application programs and the like are executed on an OS (Operating System) program as a base.

The storing unit 12 comprises a ROM (Read Only Memory), a RAM (Random Access Memory), a hard disk drive, a nonvolatile memory and the like. In the storing unit 12, various types of programs and data are stored. In the storing unit 12, the program for entirely controlling the image forming apparatus 10, the program for controlling the blinking operation of the light emitting unit 21, and the like are stored. By executing various types of processes by the CPU of the control unit 11 in accordance with these programs, the function of the image forming apparatus 10 is realized. The program for entirely controlling the image forming apparatus 10 and the program for controlling the blinking operation of the light emitting unit 21 may be the separate programs, or may be integrated into one program.

The image processing unit 13 executes the rasterization process for converting print data into image data, the compression/decompression process for the image data, and the like in addition to the processings, such as the enlargement/reduction and the rotation of the image data.

The image reading unit 14 has the function for obtaining the image data by optically reading an original. For example, the image reading unit 14 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The operation panel 15 comprises a display unit 16 and an operating unit 17. The display unit 16 is configured by a liquid crystal display (LCD) or the like, and has the function for displaying various types of operating windows, setting windows and the like. The operating unit 17 comprises various types of operation switches, such as a start button and the like, a touch panel provided on the display screen of the display unit 16, and the like. The touch panel detects the coordinate position on which the display screen of the display unit 16 is pushed down by a touch pen, the user's finger or the like. Further, the touch panel detects the flick operation, the drag operation, the operation to the scroll bar, and the like.

The printer unit 18 has the function for forming an image on the recording sheet in accordance with the image data. In this embodiment, the printer unit 18 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, in the printer unit 18, an image may be formed by another method.

The network communication unit 19 has the function for communicating with the server 40, an external terminal and the like via the network 2.

The light emitting unit 21 comprises the light emitting element, such as the LED, and the driver element thereof. The light emitting unit 21 may be provided on the operation panel 15. The light emitting unit 21 may comprise the light emitting elements which emit a plurality of color lights in order to give the intuitive visual information to a user.

FIG. 3 is a block diagram showing the schematic configuration of the portable terminal 30. The portable terminal 30 comprises a control unit 31, a storing unit 32, an image pickup unit 33, a display unit 34, an operating unit 35, a network communication unit 36, and the like.

The control unit 31 is configured by a CPU for controlling the operation of the portable terminal 30, and the like. By the CPU of the control unit 31, a middleware, application programs and the like are executed on an OS program as a base.

The storing unit 32 comprises a RAM, a nonvolatile flash ROM, an SSD (Solid State Drive) and the like. In the storing unit 32, various types of programs, such as the program for analyzing the image shot by the image pickup unit 33 and recognizing the blinking pattern, the program for preparing the connection request and transmitting it to the server 40, and the like, are stored. By executing various types of processes by the control unit 31 in accordance with these programs, the function of the portable terminal 30 is realized. The program for recognizing the blinking pattern and the program for preparing the connection request and transmitting it to the server 40 may be the separate programs, or may be integrated into one program.

The image pickup unit 33 comprises an image pickup element, an optical lens and the like. The image pickup unit 33 has the function for converting the information of the image projected on the image pickup element by the optical lens into the electric signal and for outputting the signal.

The display unit 34 is configured by a liquid crystal display or the like, and has the function for displaying various types of operating windows, setting windows and the like. The operating unit 35 comprises some operation switches, a touch panel provided on the display screen of the display unit 34, and the like.

The network communication unit 36 has the function for communicating with the server 40, an external terminal and the like by connecting with the network 2 via the access point 3 by using the wireless communication, such as the wireless LAN.

Figure 4:
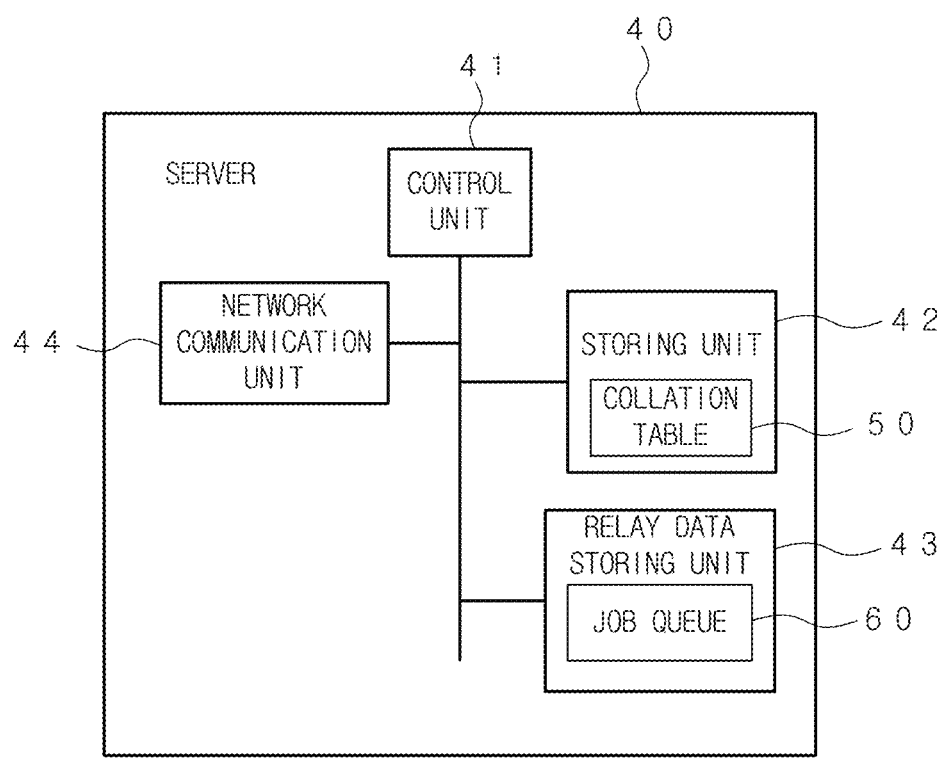
FIG. 4 is a block diagram showing the schematic configuration of the server.

FIG. 4 is a block diagram showing the schematic configuration of the server 40. The server 40 comprises a control unit 41, a storing unit 42, a relay data storing unit 43, a network communication unit 44, and the like.

The control unit 41 is configured by a CPU for controlling the operation of the server 40, and the like. By the CPU of the control unit 41, a middleware, application programs and the like are executed on an OS program as a base.

The storing unit 42 comprises a RAM, a nonvolatile flash ROM, a hard disk drive and the like. In the storing unit 42, various types of programs, such as the program for transmitting the blinking request to the image forming apparatus 10, the program for carrying out the connection setting by collating the blinking pattern, the program for relaying the communication between the image forming apparatus 10 and the portable terminal 30 in which the IP addresses are related by the valid connection setting, and the like, are stored. By executing various types of processes by the control unit 41 in accordance with these programs, the function of the server 40 is realized. The program for transmitting the blinking request, the program for carrying out the connection setting and the program for relaying the communication may be separate programs, or may be integrated into one program.

Further, in the storing unit 42, the collation table 50 for storing the information relating to the connection setting is stored. The collation table 50 will be explained in detail below.

The relay data storing unit 43 has the function for temporarily storing the data which is relayed in accordance with the connection setting, since the data is received from the relay source until the data is transmitted to the relay destination. The relay data storing unit 43 is configured by a hard disk drive which is a large-capacity nonvolatile memory. In the relay data storing unit 43, the job queue 60 for processing the jobs (relay jobs) relating to the relay of the data in the reception order is provided.

The network communication unit 44 has the function for communicating with the portable terminal 30, an external terminal and the like via the network 2.

FIG. 5 shows an example of the collation table 50. In the collation table 50, for each image forming apparatus 10, the apparatus ID, the apparatus IP address, the blinking pattern, the blinking status, the apparatus status, the connection frequency and the terminal IP address are stored so as to relate them. In case of FIG. 5, in one horizontal row, the information relating to one image forming apparatus 10 is arranged.

The apparatus ID is the identification number or the name which is assigned to the image forming apparatus 10. The apparatus IP address is the IP address of the image forming apparatus 10. The blinking pattern is one assigned to the image forming apparatus 10, and is expressed by the code arranging the predetermined number of values "1" and "0". The value "1" indicates the lighting, and the value "0" indicates the extinction.

The blinking status is the information indicating whether the light emitting unit 21 of the image forming apparatus 10 normally blinks or not. The server 40 registers or updates the blinking status in the collation table 50 by receiving the notification indicating that the abnormality of the light emitting unit 21 is detected by the self-diagnosis, from the image forming apparatus 10.

In the apparatus status, the information indicating whether the image forming apparatus 10 cannot normally execute the job, for example, because the door is open in order to solve the deficiency of the consumables (for example, out of toner) or the paper jamming, is registered. For example, the server 40 updates the apparatus status in the collation table 50 by receiving the notification indicating that the image forming apparatus 10 is out of toner and cannot print an image, from the image forming apparatus 10.

The connection frequency indicates the number of times of the connection setting which is carried out by receiving the connection request from the portable terminal 30. The terminal IP address is the IP address of the portable terminal 30 which is related to the IP address of the image forming apparatus 10 by the connection setting.

According to FIG. 5, MFP4 indicates the initial status of the image forming apparatus 10 which is registered in the collation table 50. In MFP1, the valid connection setting for the portable terminal 30 is registered. In MFP2, the apparatus status is out of toner, and the connection setting is not carried out. In MFP3, the abnormality of the blinking of the light emitting unit 21 is caused.

Figure 6:
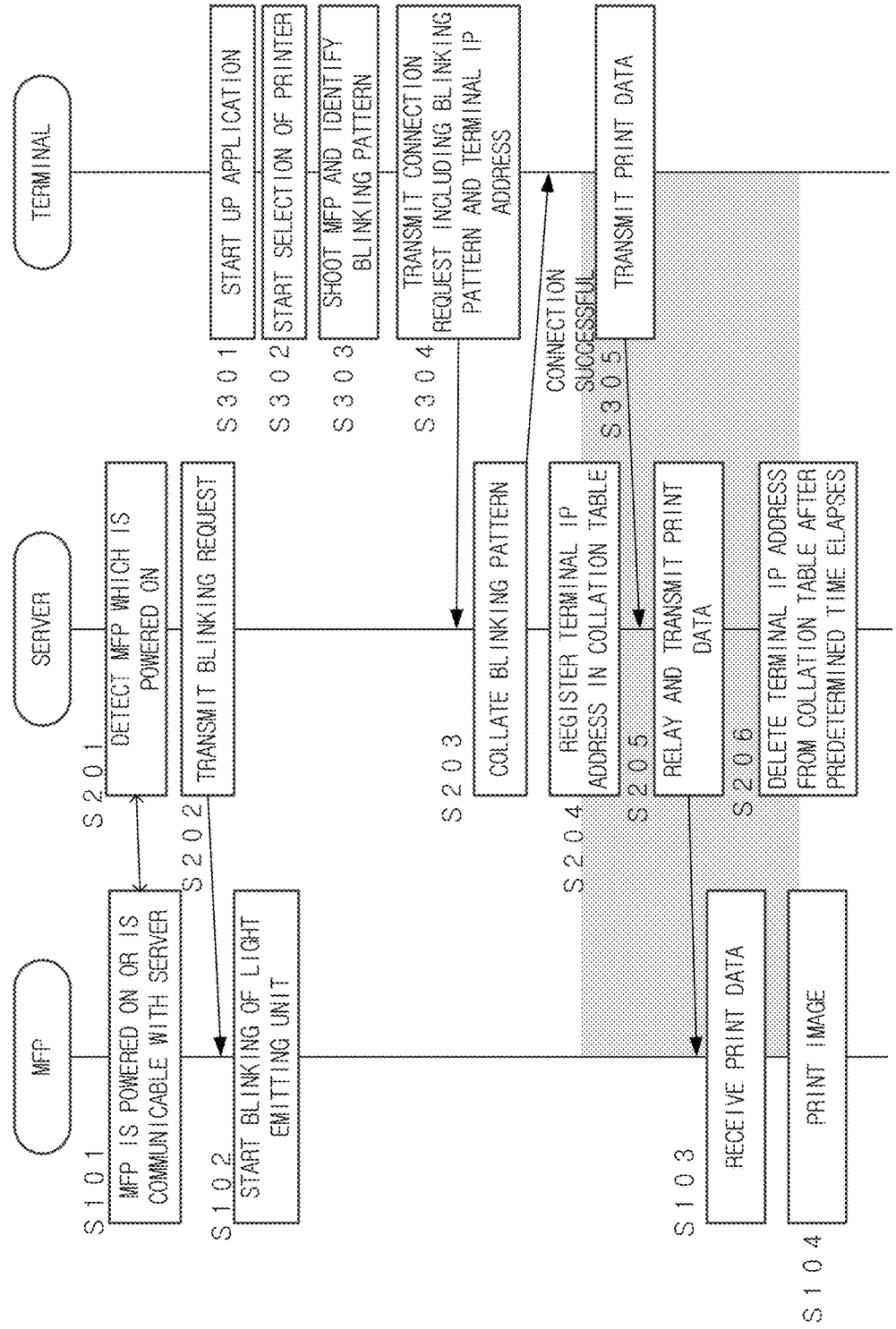
FIG. 6 is a sequence diagram showing the basic operation of the relay connection system.

FIG. 6 is a sequence diagram showing the basic operation of the relay connection system 5. When the server 40 detects that one of the image forming apparatuses 10 which are connected in the same network environment, is powered on or is communicable with the server 40 (S101) (S201), the unique blinking pattern to be assigned to the above image forming apparatus 10 (the blinking pattern which is different from the blinking pattern to be assigned to another image forming apparatus 10) is generated. Then, the server 40 transmits the blinking request including the generated blinking pattern to the above image forming apparatus 10 (S202). At this time, the IP address and the blinking pattern of the above image forming apparatus 10 are registered in the collation table 50 so as to relate them to each other.

The image forming apparatus 10 receiving the blinking request instructs the light emitting unit 21 thereof at the blinking pattern included in the blinking request (S102). Hereinafter, the image forming apparatus 10 continues this blinking operation. The blinking operation of the light emitting unit 21 is carried out in the period in which the blinking can be precisely identified from the image shot by the image pickup unit 33 of the portable terminal 30. The above period is preferably within the range in which the blinking cannot be recognized with the naked eye. For example, in case that the image pickup unit 33 picks up the images at 30 frames/second, the light emitting unit 21 blinks by setting the minimum ON term and Off term to about $\frac{1}{30}$ second to $\frac{1}{15}$ second.

In the portable terminal 30, the predetermined application program (hereinafter, referred to as the relay connection application) for transmitting the print data to the image forming apparatus 10 is started up (S301). Hereinafter, the portable terminal 30 operates in accordance with the relay connection application. The portable terminal 30 starts the selection of the printer (image forming apparatus 10) which is the transmission destination of the print data (S302) and starts up the image pickup unit 33. The user adjusts the direction and the zoom of the portable terminal 30 so as to shoot the image forming apparatus 10 to be set to the transmission destination of the print data. The control unit 31 of the portable terminal 30 analyzes the shot image of the image pickup unit 33 in real time and recognizes the blinking pattern of the light emitting unit 21 of the image forming apparatus 10 (S303). Then, the portable terminal 30 prepares the connection request including the recognized blinking pattern and the IP address of the portable terminal 30, and transmits the connection request to the server 40 (S304).

The server 40 receiving the connection request searches the blinking pattern which is coincident with the blinking pattern included in the connection request, from the collation table 50 (S203). In case that the coincident blinking pattern is found, the IP address of the portable terminal 30, which is included in the received connection request is stored in the collation table 50 so as to relate the IP address of the portable terminal 30 to the apparatus IP address related to the coincident blinking pattern, and the connection setting is carried out (S204). For example, in case that the blinking pattern included in the received connection request is coincident with the blinking pattern of MFP1 shown in FIG. 5, the connection setting is carried out by registering the IP address of the portable terminal 30, which is included in the received connection request, in the box of the terminal IP address corresponding to MFP1.

When the connection setting is valid, the server 40 relays the data communication between the image forming apparatus 10 and the portable terminal 30 in which the IP addresses are related by the connection setting. Specifically, the portable terminal 30 which carries out the connection request transmits the print data to the server 40 (S305). Then, the server 40 which receives the above print data searches the terminal IP address which is coincident with the IP address of the transmission source which transmits the print data, from the collation table 50, and transmits the print data to the relay destination by using the apparatus IP address registered in the collation table 50 so as to relate the apparatus IP address to the coincident terminal IP address, as the IP address of the relay destination (S205). The image forming apparatus 10 which receives the print data (S103) prints an image in accordance with the print data (S104).

The server 40 invalidates the connection setting after the predetermined time elapses (S206). Specifically, the server 40 deletes the relevant terminal IP address from the collation table 50. The connection setting is invalidated when the predetermined time elapses since the connection setting is carried out. Alternatively, in case that the data to be relayed is received before the predetermined time elapses since the connection setting is carried out, the connection setting is invalidated when the predetermined time elapses since the reception of the latest data is finished. In FIG. 6, the period which is shown by the grayed background is the period in which the connection setting is valid. In case that the server 40 receives a new connection request for connecting with the image forming apparatus 10 for which another connection setting has been already carried out, and the correction setting is carried out in accordance with the above new connection request, the terminal IP address corresponding to the above image forming apparatus 10 is overwritten to the IP address included in the new connection request. Therefore, at this time, the previous connection setting is invalidated.

In case that the connection setting has not been invalidated yet, the portable terminal 30 can successively transmit a plurality of print data to the image forming apparatus 10 via the server 40 without transmitting the connection request again.

As described above, by shooting the blinking of the light emitting unit 21 of the image forming apparatus 10 to which the user intends to transmit the print data, using the image pickup unit 33 of the portable terminal 30, the communication between the portable terminal 30 and the above image forming apparatus 10 via the server 40 can be established. As a result, while the user is in the place apart from the intended image forming apparatus 10 by a distance at which the blinking can be shot, for example, several meters to ten and several meters, the print data and the like can be transmitted to the intended image forming apparatus 10 via the server 40.

Further, because the communication between the portable terminal 30 and the image forming apparatus 10 can be established without transmitting the IP address of the image forming apparatus 10 to the portable terminal 30, the security can be improved.

Further, because the connection setting is invalidated after the predetermined time elapses, in case that the print is successively carried out several times, it is not required to carryout the connection request by shooting the light emitting unit 21 of the image forming apparatus 10 using the image pickup unit 31 every time. It is possible to successively transmit a plurality of print data to the intended image forming apparatus 10 with less labor.

Figure 7:
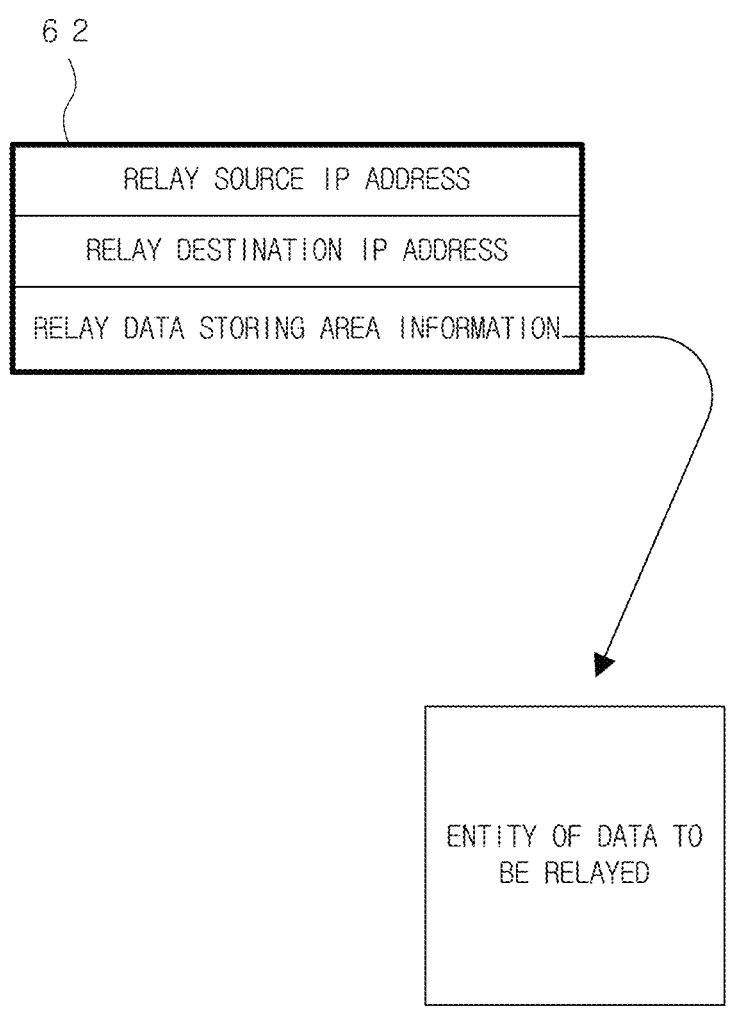
FIG. 7 is a view showing the structure of the relay job information.

When the server 40 relays the data, the server 40 temporarily stores the data received from the relay source in the relay data storing unit 43. Then, the server 40 sequentially reads out the data from the relay data storing unit 43 and transmits the data to the relay destination. The connection setting may be valid only when the server 40 receives the data from the relay source. It is preferable that even though the connection setting has been invalidated when the data is read out from the relay data storing unit 43 and is transmitted to the relay destination, the data can be smoothly relayed. Therefore, as shown in FIG. 7, by referring to the collation table 50 when the reception of the data from the relay source is started, the relay source IP address and the relay destination IP address are obtained. Then, the relay job information 62 which includes the above IP addresses and the relay data storing area information indicating the storing area for storing the data to be transmitted to the relay destination, in the relay data storing unit 43, is generated and stored. The server 40 transmits the data to the relay destination in accordance with the stored relay job information 62. The entity of the data to be relayed is stored in the predetermined area of the relay data storing unit 43, which is different from the area in which the relay job information 62 is stored.

Figure 8:
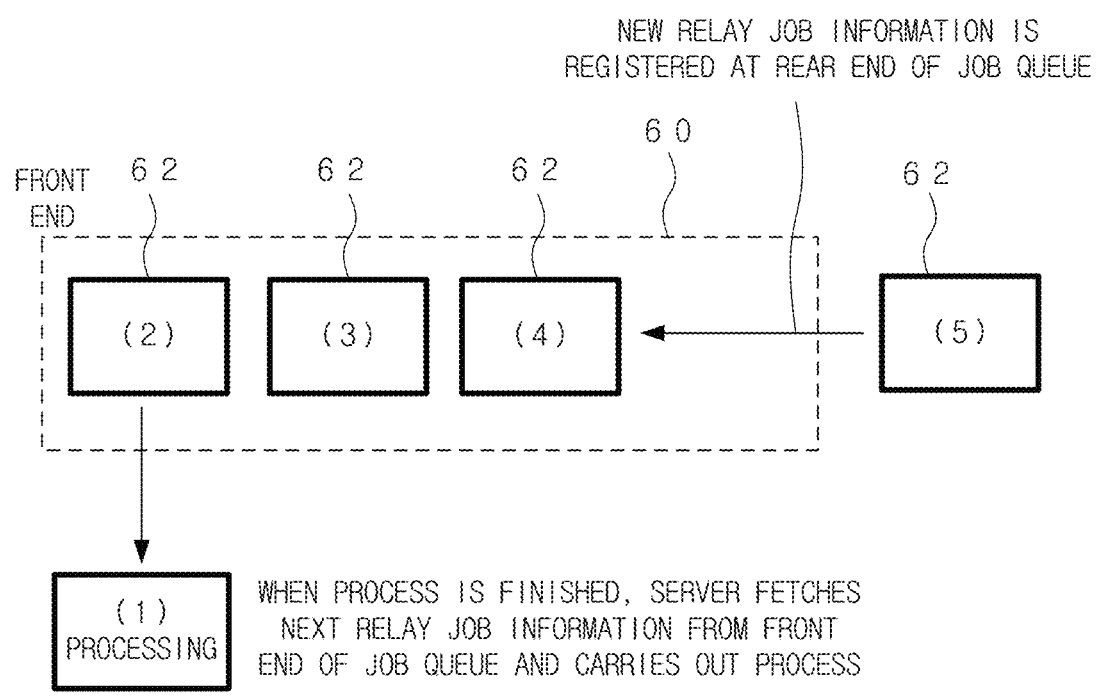
FIG. 8 is a view showing the job queue in which a plurality of pieces of the relay job information can be stored in the generation order.

Further, in the server 40, a plurality of data can be temporarily stored in the relay data storing unit 43. The server 40 sequentially reads out the data from the relay data storing unit 43 in the order of the temporary storing of the data and transmits the data to the relay destination. Therefore, as shown in FIG. 8, the server 40 has the job queue 60 for storing a plurality of pieces of relay job information 62 in the generation order.

When the server 40 generates new relay job information 62, the server 40 registers the relay job information 62 at the rear end of the job queue 60. Further, in case that the relay job information 62 is registered in the job queue 60, the server 40 fetches the relay job information 62 registered at the front end of the job queue 60 and carries out the process for transmitting the data to the relay destination by reading out the data from the relay data storing unit 43 in accordance with the fetched relay job information 62. When the process is finished, the server 40 fetches the next relay job information 62 from the front end of the job queue 60. By the above method, the data is transmitted to the relay destination in order.

Next, the case in which the blinking patterns of a plurality of image forming apparatuses 10 are recognized from the image shot by the image pickup unit 33 of the portable terminal 30, will be explained.

When the specific image forming apparatus 10 is shot by the image pickup unit 33 of the portable terminal 30, there are some cases that a plurality of image forming apparatuses 10 are shot within the shooting range of the image pickup unit 33. In these cases, the portable terminal 30 receives the selection of one image forming apparatus among the shot image forming apparatuses 10 from the user, and recognizes the blinking pattern of the selected image forming apparatus 10. Then, the portable terminal 30 prepares the connection request including the recognized blinking pattern and transmits the connection request to the server 40.

Figure 9:
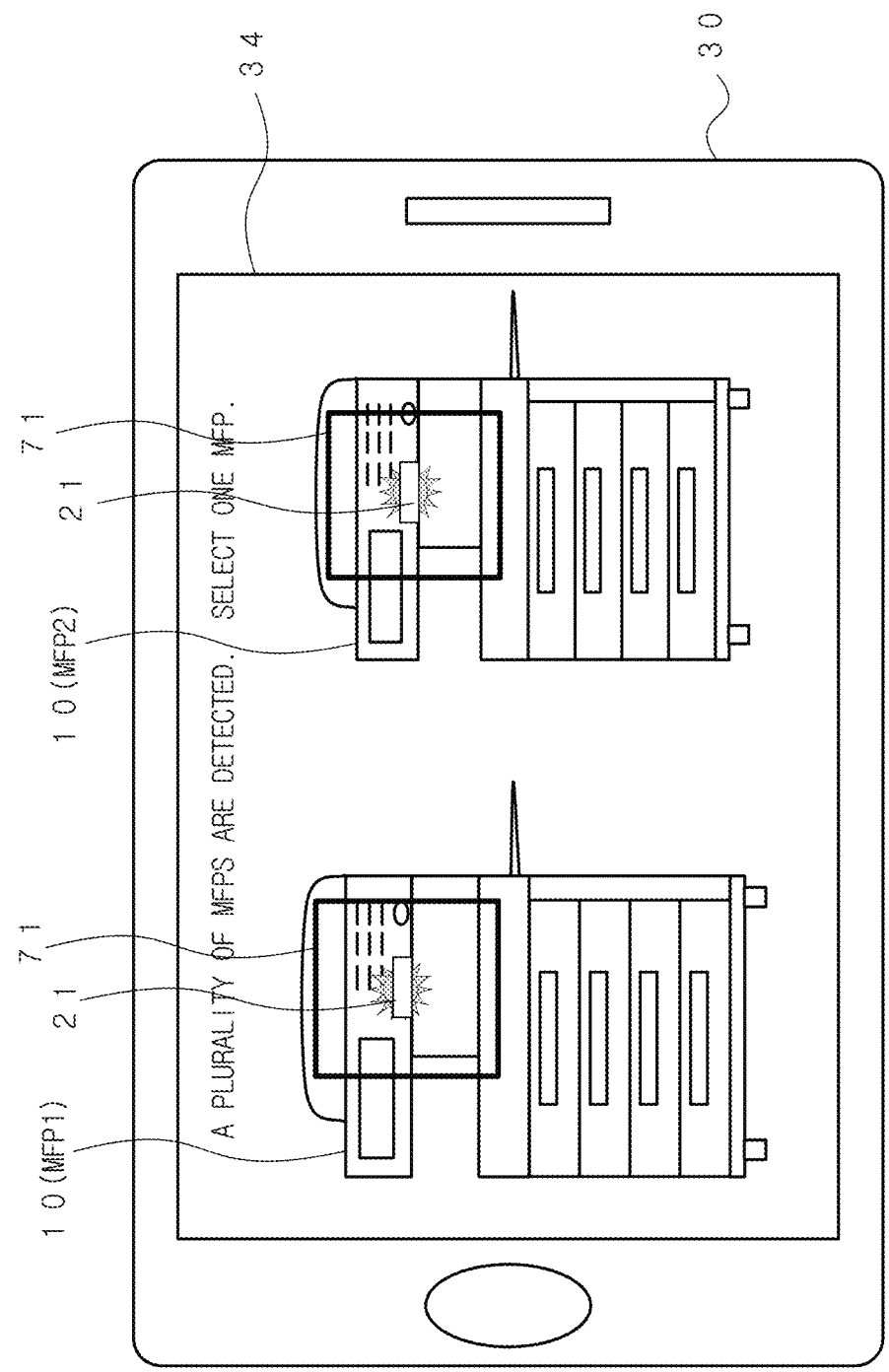
FIG. 9 is a view showing an example of the situation in which a plurality of image forming apparatuses are shot.

FIG. 9 shows an example of the situation in which a plurality of image forming apparatuses 10 are shot. The portable terminal 30 displays the selection frames 71 so as to overlap with the light emitting unit 21 of each image forming apparatus 10 which exists in the shot image. Then, the portable terminal 30 receives the touch operation for the selection frame 71 as the selection operation.

Next, the abnormality of the blinking of the light emitting unit 21 will be explained.

Figure 10:
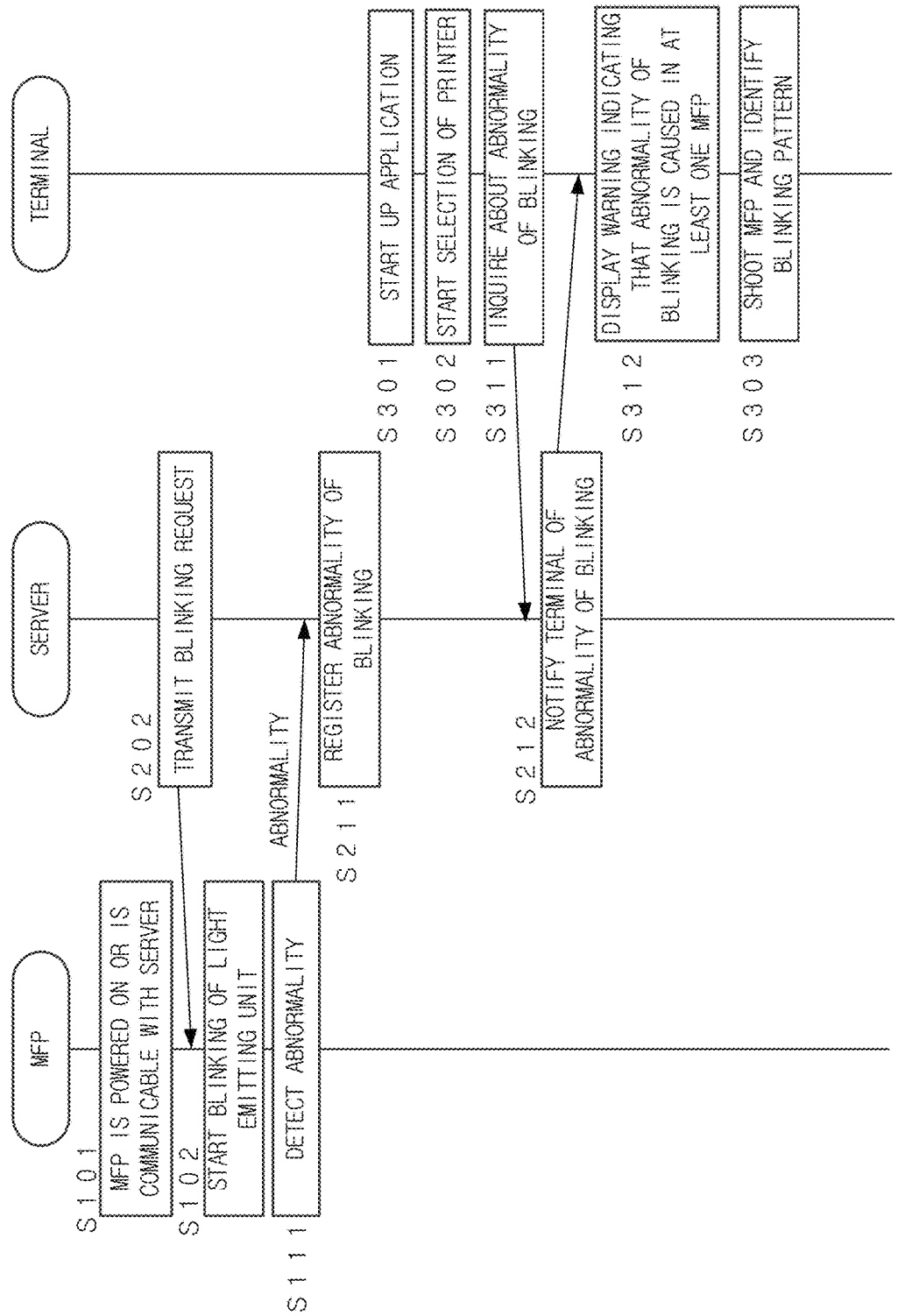
FIG. 10 is a sequence diagram showing the operation of the relay connection system in case that the abnormality of the blinking of the light emitting unit is caused in the image forming apparatus.

The image forming apparatus 10 has the function for detecting the abnormality of the blinking of the light emitting unit 21 therein and for notifying the server 40. FIG. 10 shows the operation of the relay connection system 5 in case that the abnormality of the blinking of the light emitting unit 21 is caused in the image forming apparatus 10. In FIG. 10, the steps which are the same as those of FIG. 6 are denoted by the same step numbers.

When the image forming apparatus 10 receives the blinking request from the server 40, the image forming apparatus 10 starts the blinking of the light emitting unit 21 thereof (S102). At this time, the image forming apparatus 10 confirms whether the light emitting unit 21 normally blinks by the self-diagnosis function. In case that the above abnormality is detected, the image forming apparatus 10 notifies the server 40 of the abnormality of the blinking (S111).

The server 40 receiving the notification relating to the abnormality of the blinking registers the status "abnormal" as the blinking status of the image forming apparatus 10 which notifies the server 40 (S211). In the example shown in FIG. 5, the status "abnormal" is registered in the blinking status of MFP3.

After the relay connection application is started up, the portable terminal 30 inquires of the server 40 whether the abnormality of the blinking is caused in each image forming apparatus 10 (S311). When the server 40 receives the above inquiry, the server 40 refers to the collation table 50. Then, in case that the status "abnormal" is registered in the blinking status of any one of the image forming apparatuses 10, the server 40 transmits the notification indicating that the abnormality of the blinking of the light emitting unit 21 is caused in at least one image forming apparatus 10, to the portable terminal 30 which transmits the above inquiry (S212).

The portable terminal 30 which receives the above notification displays the warning indicating that the abnormality of the blinking of the light emitting unit 21 is caused in at least one image forming apparatus 10 (S312), and carries out the shooting operation (S303). For example, in case that the light emitting unit 21 of the image forming apparatus 10 to be shot does not emit the light, the user cannot specify that the abnormality of the light emitting unit 21 of the image forming apparatus 10 to be shot is caused, but can recognize the possibility of the above abnormality by viewing the warning.

In case that the image forming apparatus 10 receives the blinking request from the server 40, the image forming apparatus 10 may carry out the self-diagnosis for the light emitting unit 21 and may notify the server 40 of the result of the self-diagnosis regardless of whether the above result indicates the status "normal" or the status "abnormal".

Next, the case in which the frequency of the blinking of each light emitting unit 21 is reduced or the blinking request is not carried out according to the frequency of the connection setting for each image forming apparatus 10, will be explained.

The server 40 counts the number of times of the connection setting for each image forming apparatus 10. In the collation table 50, the number of times of the connection setting is registered in the box of the connection frequency. When any one of the image forming apparatuses 10 is powered on, or when any one of the image forming apparatuses 10 is communicable with the server 40, the server 40 checks whether the connection frequency of the above image forming apparatus 10 is not less than the threshold value. When the connection frequency is not less than the threshold value, the server 40 transmits the usual blinking request to the above image forming apparatus 10. On the other hand, when the connection frequency is less than the threshold value, the server 40 does not transmit the blinking request to the above image forming apparatus 10 or the server 40 transmits the blinking request including the instruction for setting the frequency of the blinking lower than usual, to the above image forming apparatus 10.

Therefore, the light emitting unit 21 of the image forming apparatus 10 which is not often used by carrying out the connection setting is prevented from prodigally blinking and it is possible to save the energy.

For example, the blinking is usually carried out 60 times per minute in accordance with the blinking pattern. On the other hand, in the image forming apparatus 10 receiving the blinking request including the instruction for setting the frequency of the blinking lower than usual, the blinking is carried out only 20 times per minute in accordance with the blinking pattern.

Next, the first operation mode and the second operation mode will be explained as the operations to be carried out in case that the image forming apparatus 10 is in the apparatus status in which the image forming apparatus 10 cannot execute the job because of the deficiency of the consumables, such as the toner, or the status in which the door is open. The case in which the remaining amount of the consumables is low and the job cannot be executed in the near future may be included in the apparatus status in which the job cannot be executed.

<First Operation Mode>

When the image forming apparatus 10 is in the status in which the job cannot be executed because of the status of the consumables (for example, out of toner) or the status in which the door is open, the image forming apparatus 10 does not accept the blinking request from the server 40, and instructs the light emitting unit 21 therein not to blink. Therefore, even though the image forming apparatus 10 receives the request from the portable terminal 30, the image forming apparatus 10 which cannot execute the job prevents the light emitting unit 21 from prodigally blinking. As a result, it is possible to save the energy.

<Second Operation Mode>

Figure 11:
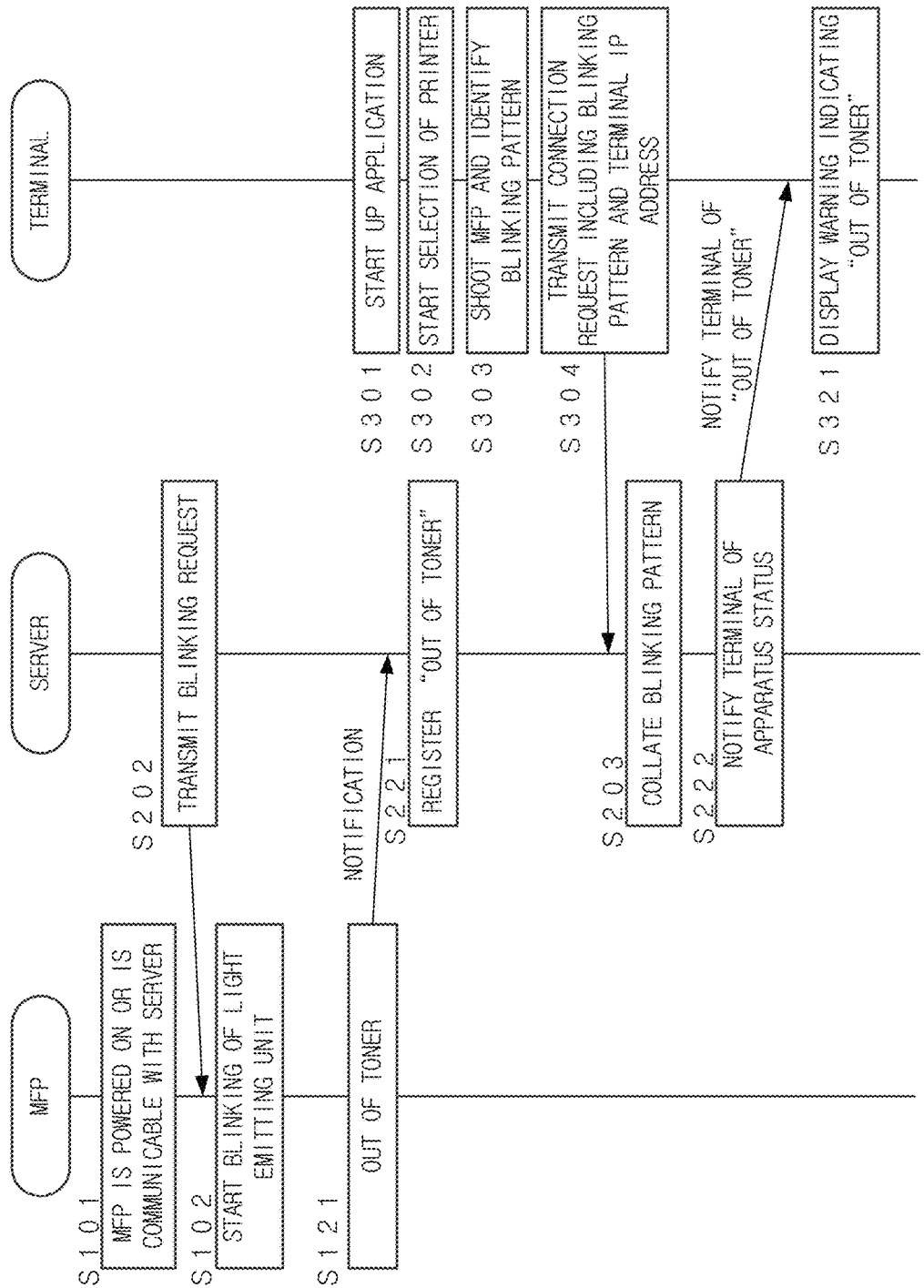
FIG. 11 is a sequence diagram showing the operation of the relay connection system in case that the image forming apparatus is out of toner.

As shown in FIG. 11, in case that the image forming apparatus 10 is in the status in which the image forming apparatus 10 cannot execute the job because of the status of the consumables (for example, out of toner) or the status in which the door is open, the image forming apparatus 10 notifies the server 40 of the apparatus status thereof in which the job cannot be executed (preferably, the apparatus status indicates the concrete contents, for example, out of toner, or the like) (S121). The server 40 receiving this notification registers the apparatus status of the image forming apparatus 10 which transmits the above notification, in the collation table 50 (S221). In the example shown in FIG. 5, the apparatus status "out of toner" is registered in the apparatus status of MFP2.

When the server 40 receives the connection request from the portable terminal 30, in case that the apparatus status in which the job cannot be executed, such as "out of toner", is registered in the collation table 50 as the apparatus status of the image forming apparatus 10 having the blinking pattern which is coincident with the blinking pattern included in the connection request, the server 40 notifies the transmission source which transmits the above connection request, of the apparatus status (S222). The portable terminal 30 receiving the above notification displays the contents of the received apparatus status on the display unit 34 therein (S321). Therefore, the user can recognize that the image forming apparatus 10 shot by the portable terminal 30 is in the status in which the job cannot be executed, and the cause thereof. As a result, it is possible to easily carry out the solution, for example, to seek another image forming apparatus 10 as the transmission destination of the print data.

Next, the forced emitting of the light emitting unit 21 in accordance with the user's instruction will be explained.

In case that the image forming apparatus 10 in which the light emitting unit 21 does not blink, exists for some reasons, for example, in case that the light emitting unit 21 does not blink because the connection frequency is not more than the threshold value or in case that the light emitting unit 21 does not blink because the image forming apparatus 10 is in the status in which the job cannot be executed, it is possible to carry out the connection setting for the image forming apparatus 10 by forcedly blinking the light emitting unit 21 in accordance with the user's instruction.

When the portable terminal 30 receives the user's instruction for forcedly emitting the light by operating the predetermined switch or the button on the display unit 34, the portable terminal 30 transmits the predetermined forced emitting instruction to the server 40.

The server 40 receiving the forced emitting instruction transmits the forced emitting command for carrying out the blinking operation of the light emitting units 21 for the predetermined time to all of the image forming apparatuses 10. Each image forming apparatus 10 receiving the forced emitting command instructs the light emitting unit 21 therein to blink in accordance with the blinking pattern for the predetermined time.

The user can transmit the connection request to the server 40 by shooting the intended image forming apparatus 10 during the blinking of the light emitting unit 21 in accordance with the forced emitting command.

Figure 12:
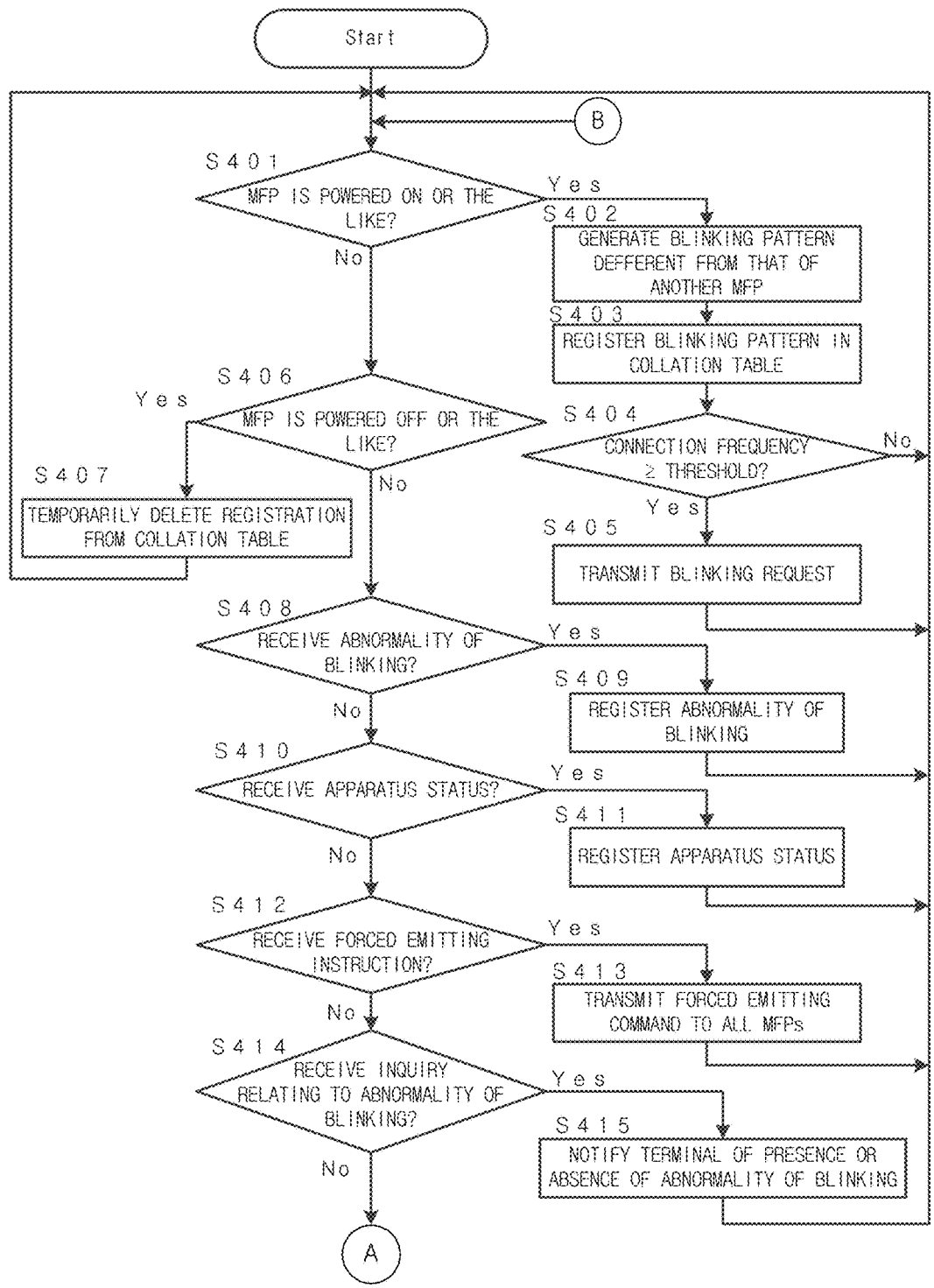
FIGS. 12 and 13 are a flowchart showing the process which is carried out by the server.
Figure 13:
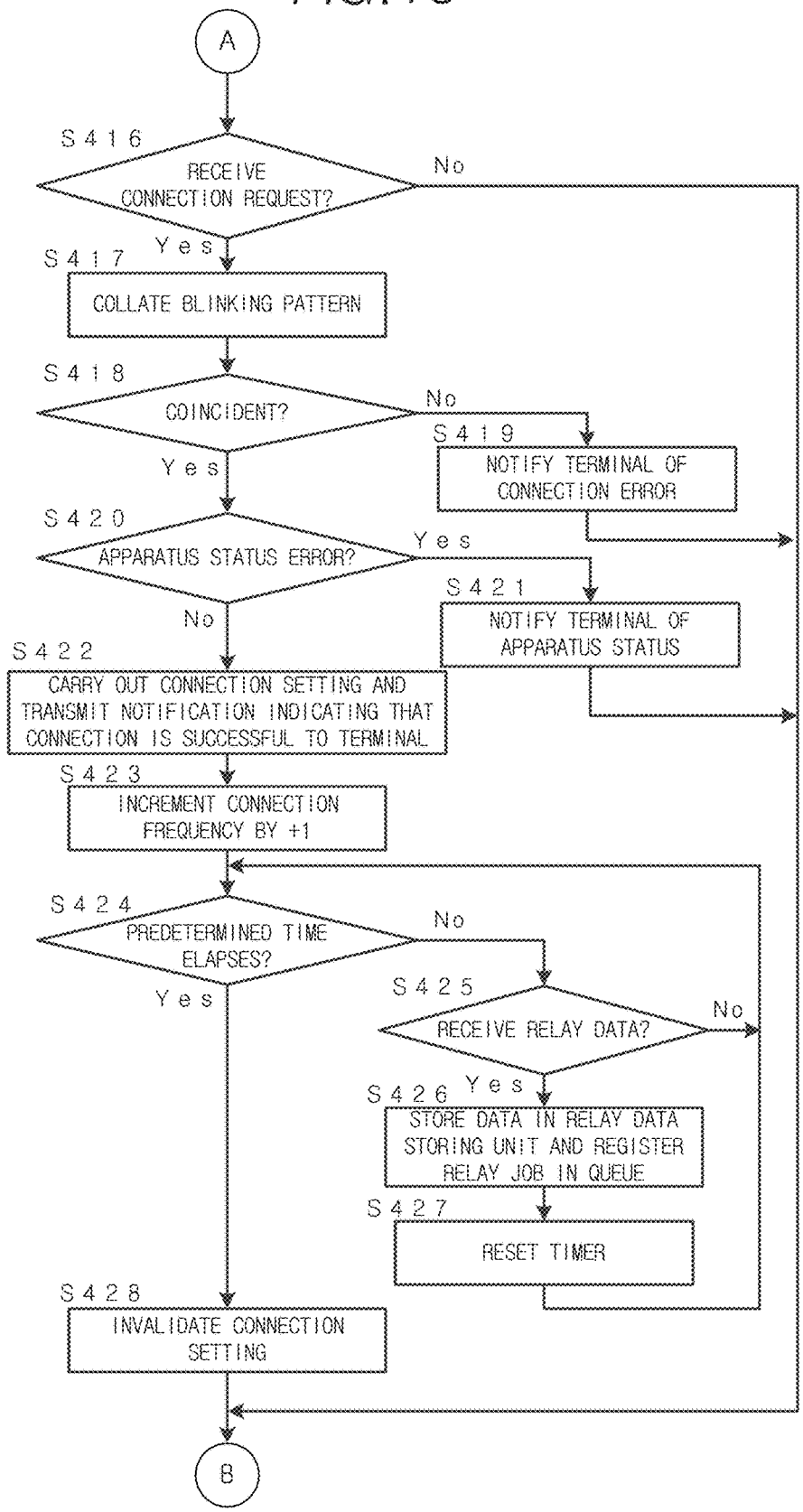

FIGS. 12 and 13 are the flowchart showing the process which is carried out by the server 40. The server 40 realizes the process shown in the flowchart of FIGS. 12 and 13 by executing the programs stored in the storing unit 42 using the control unit 41 (CPU).

When the server 40 detects that one of the image forming apparatuses 10 which are connected in the same network environment, is powered on or is communicable with the server (Step S401; Yes), the server 40 generates the unique blinking pattern to be assigned to the above image forming apparatus 10 (Step S402). Then, the server 40 registers the generated blinking pattern in the collation table 50 so as to relate the blinking pattern to the IP address of the above image forming apparatus 10 (Step S403).

Next, the server 40 checks whether the connection frequency of the above image forming apparatus 10, which is registered in the collation table 50, is not less than the threshold value (Step S404). When the connection frequency is not less than the threshold value (Step S404; Yes), the server 40 transmits the blinking request to the above image forming apparatus 10 (Step S405). Then, the process returns to Step S401. On the other hand, when the connection frequency is less than the threshold value (Step S404; No), the server 40 does not transmit the blinking request (or the server 40 transmits the blinking request for setting the frequency of the blinking lower). Then, the process returns to Step S401.

When the server 40 detects that one of the image forming apparatuses 10 which are connected in the same network environment, is powered off, or is not communicable with the server 40 (Step S406; Yes), the server 40 temporarily deletes the registration relating to the above image forming apparatus 10 from the collation table 50 (Step S407). Then, the process returns to Step S401. For example, the server 40 deletes the registration of the blinking pattern of the above image forming apparatus 10 and the terminal IP address corresponding to the above image forming apparatus 10, from the collation table 50. In the temporary deletion, at least the apparatus IP address and the connection frequency are held so as to relate them to each other, and are not deleted.

In case that the server 40 receives the notification relating to the abnormality of the blinking from the image forming apparatus 10 (Step S408; Yes), the server 40 registers the abnormality of the blinking of the light emitting unit 21 of the image forming apparatus 10 which transmits the above notification, in the collation table 50 (Step S409). Then, the process returns to Step S401.

In case that the server 40 receives the notification relating to the apparatus status from the image forming apparatus 10 (Step S410; Yes), the server 40 registers the contents of the received apparatus status of the image forming apparatus 10 which transmits the above notification, in the collation table 50 (Step S411). Then, the process returns to Step S401.

In case that the server 40 receives the forced emitting instruction from the portable terminal 30 (Step S412; Yes), the server 40 transmits the forced emitting command to all of the image forming apparatuses 10 which are connected in the same network environment (Step S413; Yes). Then, the process returns to Step S401.

In case that the server 40 receives the inquiry relating to the abnormality of the blinking from the portable terminal 30 (Step S414; Yes), the server 40 refers to the collation table 50. In case that the abnormality of the blinking is caused in anyone of the image forming apparatuses 10, the server 40 transmits the notification indicating the abnormality to the portable terminal 30 which is the transmission source of the above inquiry. On the other hand, in case that the abnormality of the blinking is not caused in any one of the image forming apparatuses 10, the server 40 transmits the notification indicating no abnormality to the above portable terminal 30 (Step S415). Then, the process returns to Step S401. The above notification may be transmitted to the transmission source of the above inquiry only in case that the abnormality of the blinking is caused.

In case that the server 40 receives the connection request from the portable terminal 30 (Step S416; Yes), the server 40 checks whether the blinking pattern which is coincident with the blinking pattern included in the connection request is registered in the collation table 50 (Step S417). In case that the coincident blinking pattern is not registered (Step S418; No), the server 40 notifies the portable terminal 30 which transmits the connection request, of the connection error (Step S419). Then, the process returns to Step S401.

In case that the coincident blinking pattern is registered (Step S418; Yes), the server 40 obtains the apparatus status of the image forming apparatus 10 having the above blinking pattern from the collation table 50. In case that the obtained apparatus status indicates the status in which the job cannot be executed due to out of toner or the like (Step S420; Yes), the server 40 notifies the portable terminal 30 which transmits the connection request, of the above apparatus status (Step S421). Then, the process returns to Step S401. In this case, the connection setting is not carried out.

In case that the apparatus status of the image forming apparatus 10 having the blinking pattern which is coincident with the blinking pattern included in the connection request is the status in which the job can be executed (Step S420; No), the connection setting in which the IP address of the above image forming apparatus 10 and the IP address included in the above connection request are stored so as to relate them is carried out. Further, the server 40 transmits the notification indicating that the connection setting is successful, to the portable terminal 30 which transmits the connection request (Step S422). In the connection setting, specifically, in the collation table 50, the IP address included in the connection request is registered in the box of the terminal IP address corresponding to the image forming apparatus 10 having the blinking pattern which is coincident with the blinking pattern included in the connection request. Further, in the collation table 50, the value (the number of times of the connection setting) registered in the box of the connection frequency of the above image forming apparatus 10 is incremented by +1 (Step S423).

While the connection setting is valid, the communication between the portable terminal 30 and the image forming apparatus 10 in which the IP addresses are related by the above connection setting is relayed. Specifically, when the connection setting is carried out, the timer is started to measure the predetermined time. When the predetermined time elapses (Step S424; Yes), the connection setting is invalidated (Step S428). Then, the process returns to Step S401. The invalidation of the connection setting is carried out by deleting the terminal IP address.

In case that the data to be relayed is received from one of the portable terminal 30 and the image forming apparatus 10 in which the IP addresses are related by the connection setting before the predetermined time elapses (Step S424; No, and Step S425; Yes), the server 40 stores the received data in the relay data storing unit 43 and generates the relay job information 62 to register the relay job information 62 at the rear end of the job queue 60 (Step S426). Then, the timer is reset and restarted (Step S427), and the process returns to Step S424.

Figure 14:
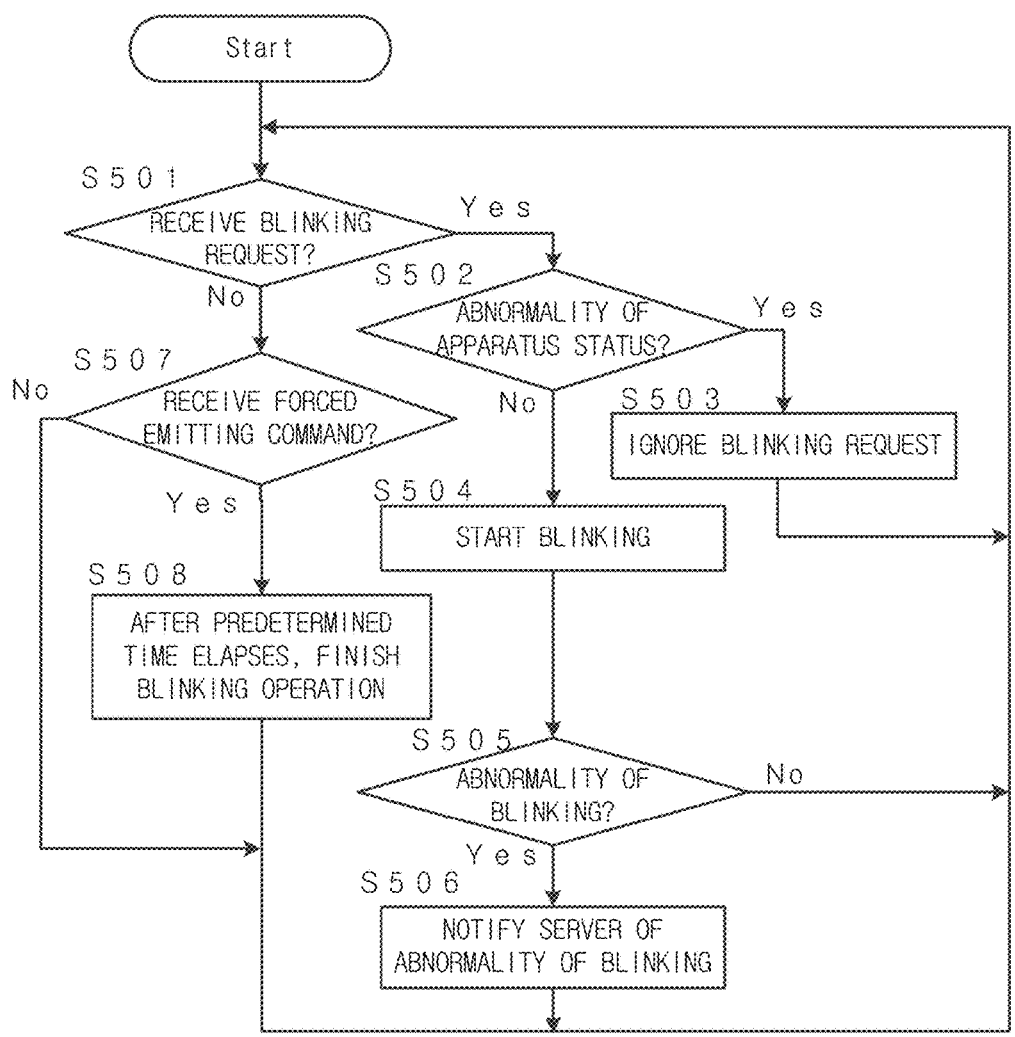
FIG. 14 is a flowchart showing the process which is carried out by the image forming apparatus in case of the first operation mode.

FIG. 14 is the flowchart showing the process which relates to the blinking operation of the light emitting unit 21 and which is carried out by the image forming apparatus 10. FIG. 14 corresponds to the case of the above-described first operation mode. The image forming apparatus 10 realizes the process shown in the flowchart of FIG. 14 by executing the programs stored in the storing unit 12 using the control unit 11 (CPU).

When the image forming apparatus 10 receives the blinking request from the server 40 (Step S501; Yes), the image forming apparatus 10 checks whether the apparatus status thereof is the status in which the job cannot be executed (Step S502). In case that the apparatus status thereof is the status in which the job cannot be executed (abnormality of the apparatus status) (Step S502; Yes), the image forming apparatus 10 ignores the blinking request, that is, does not blink the light emitting unit 21 in accordance with the blinking request (Step S503). Then, the process returns to Step S501.

In case that the apparatus status thereof is not the status in which the job cannot be executed (Step S502; No), the image forming apparatus 10 starts the blinking of the light emitting unit 21 thereof in accordance with the blinking pattern included in the received blinking request, and continues the above blinking (Step S504). At this time, the image forming apparatus 10 carries out the self-diagnosis for the blinking operation of the light emitting unit 21. In case that the abnormality of the blinking is detected (Step S505; Yes), the image forming apparatus 10 notifies the server 40 of the abnormality of the blinking (Step S506). Then, the process returns to Step S501. In case that the abnormality of the blinking is not detected (Step S505; No), the process returns to Step S501.

In case that the image forming apparatus 10 receives the forced emitting command from the server 40 (Step S507; Yes), the image forming apparatus 10 blinks the light emitting unit 21 in accordance with the blinking pattern only for the predetermined time. After the predetermined time elapses, the image forming apparatus 10 finishes the blinking operation (Step S508), and the process returns to Step S501.

Figure 15:
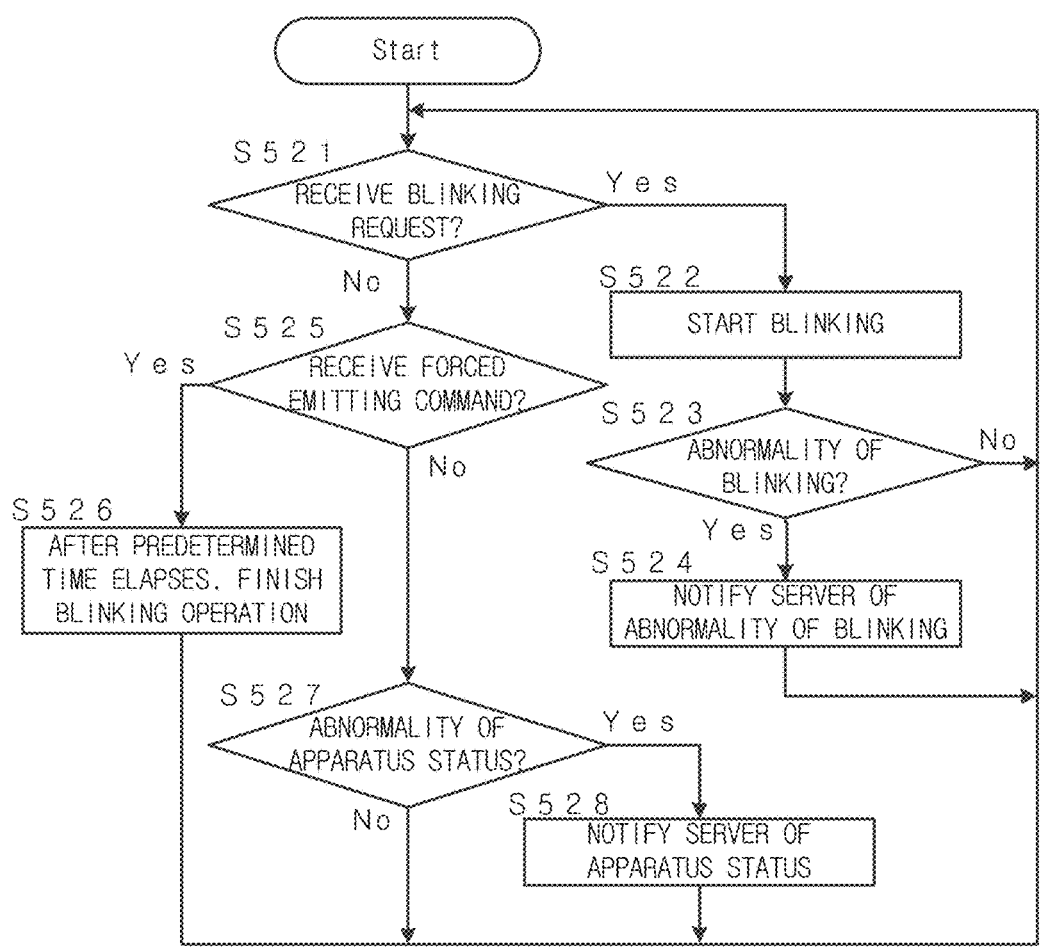
FIG. 15 is a flowchart showing the process which is carried out by the image forming apparatus in case of the second operation mode.

FIG. 15 is the flowchart showing the process which relates to the blinking operation of the light emitting unit 21 and which is carried out by the image forming apparatus 10. FIG. 15 corresponds to the case of the above-described second operation mode. The image forming apparatus 10 realizes the process shown in the flowchart of FIG. 15 by executing the programs stored in the storing unit 12 using the control unit 11 (CPU).

When the image forming apparatus 10 receives the blinking request from the server 40 (Step S521; Yes), the image forming apparatus 10 starts the blinking of the light emitting unit 21 thereof in accordance with the blinking pattern included in the received blinking request, and continues the above blinking (Step S522). At this time, the image forming apparatus 10 carries out the self-diagnosis for the blinking operation of the light emitting unit 21. In case that the abnormality of the blinking is detected (Step S523; Yes), the image forming apparatus 10 notifies the server 40 of the abnormality of the blinking (Step S524). Then, the process returns to Step S521. In case that the abnormality of the blinking is not detected (Step S523; No), the process returns to Step S521.

In case that the image forming apparatus 10 receives the forced emitting command from the server 40 (Step S525; Yes), the image forming apparatus 10 blinks the light emitting unit 21 in accordance with the blinking pattern only for the predetermined time. After the predetermined time elapses, the image forming apparatus 10 finishes the blinking operation (Step S526), and the process returns to Step S521.

The image forming apparatus 10 monitors whether the apparatus status thereof is the status in which the job cannot be executed. Incase that the apparatus status thereof is the status in which the job cannot be executed (Step S527; Yes), the image forming apparatus 10 notifies the server 40 of the above apparatus status (Step S528). Then, the process returns to Step S521. In case that the apparatus status thereof is not the status in which the job cannot be executed (Step S527; No), the process returns to Step S521.

Figure 16:
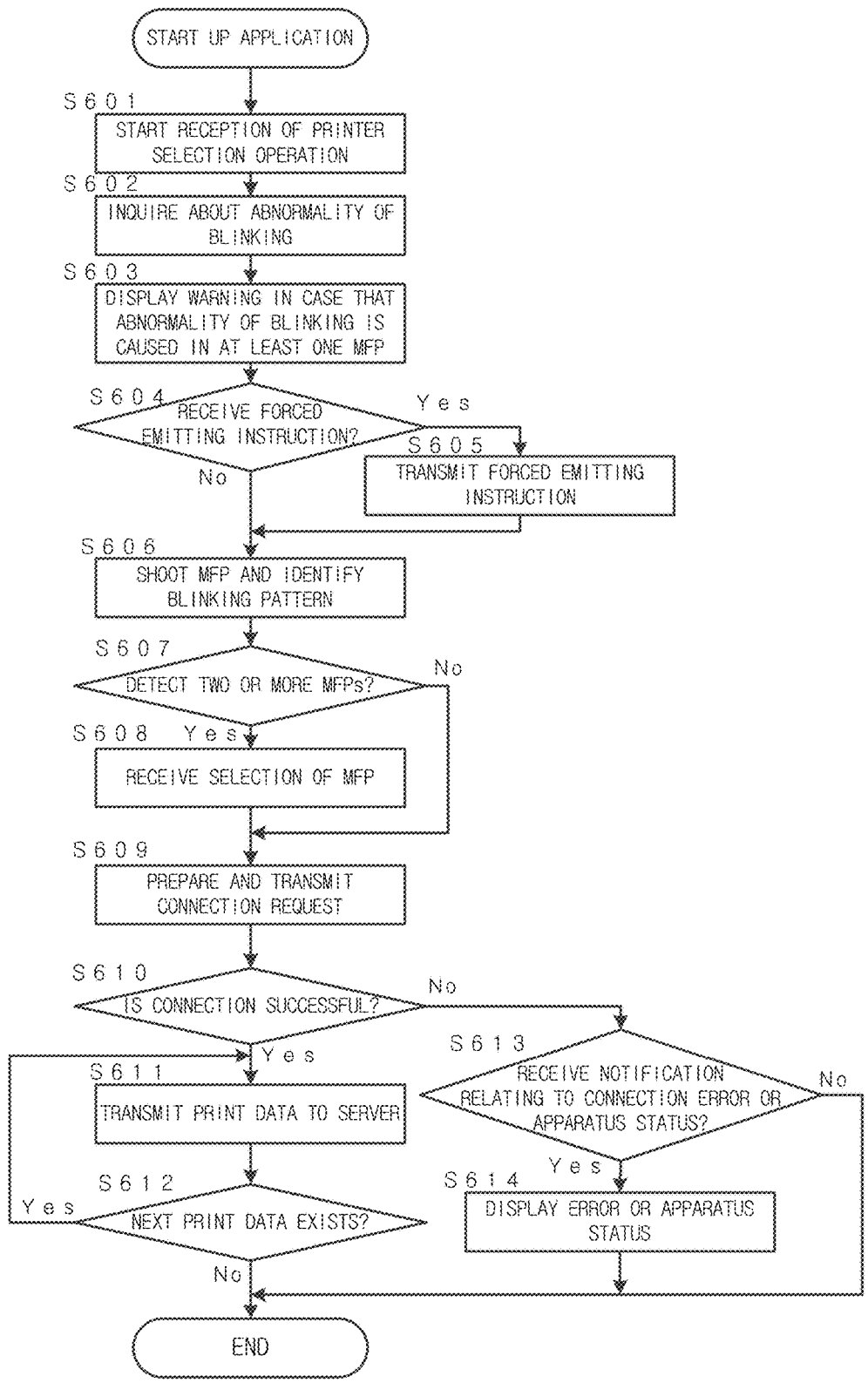
FIG. 16 is a flowchart showing the process which is carried out by the portable terminal in which the relay connection application is started up.

FIG. 16 shows the flowchart of the process which is carried out by the portable terminal 30 in which the relay connection application is started up. The portable terminal 30 realizes the process shown in the flowchart of FIG. 16 by executing the programs stored in the storing unit 32 using the control unit 31 (CPU).

When the portable terminal 30 starts the reception of the printer selection operation (Step S601), firstly, the portable terminal 30 inquires of the server 40 whether the abnormality of the blinking is caused in each image forming apparatus 10 (Step S602). In case that the response to the above inquiry indicates that the abnormality of the blinking of the light emitting unit 21 is caused in at least one image forming apparatus 10, the portable terminal 30 displays the above abnormality as the warning on the display unit 34 (Step S603).

In case that the portable terminal 30 receives the forced emitting instruction from the user (Step S604; Yes), the portable terminal 30 transmits the forced emitting instruction to the server 40 (Step S605). Then, the process proceeds to Step S606. In case that the forced emitting instruction is not received (Step S604; No), the process proceeds to Step S606.

In Step S606, the light emitting unit 21 is shot by the image pickup unit 33 and the portable terminal 30 identifies the blinking pattern of the light emitting unit 21 which exists in the shot image (Step S606). In case that the portable terminal 30 detects the blinking of each light emitting unit 21 of a plurality of image forming apparatuses 10 from the shot image (Step S607; Yes), the portable terminal 30 receives the selection of one image forming apparatus 10 (Step S608). The portable terminal 30 prepares the connection request including the blinking pattern of the light emitting unit 21 of the selected image forming apparatus 10 and transmits the connection request to the server 40 (Step S609). Then, the process proceeds to Step S610.

In case that the blinking of the light emitting unit 21 of only one image forming apparatus 10 is detected from the shot image (Step S607; No), the portable terminal 30 prepares the connection request including the blinking pattern of the light emitting unit 21 of the above image forming apparatus 10 and transmits the connection request to the server 40 (Step S609). Then, the process proceeds to Step S610.

In Step S610, the portable terminal 30 checks whether the response to the connection request from the server 40 indicates that the connection is successful. In case that the connection is successful (Step S610; Yes), the portable terminal 30 transmits the print data to the server 40 (Step S611). In case that the portable terminal 30 successively receives the instruction for transmitting another print data from the user (Step S612; Yes), the process returns to Step S611 and the portable terminal 30 transmits the above print data to the server 40. In case that the instruction for transmitting the next print data is not received from the user (Step S612; No), the process is ended.

In case that the response to the connection request from the server 40 does not indicate that the connection is successful (Step S610; No) and is the notification relating to the correction error or the apparatus status indicating the abnormality (Step S613; Yes), the contents of the notification are displayed as the warning (Step S614). Then, the process is ended.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the image shot by the image pickup unit 33 of the portable terminal 30 is analyzed by the portable terminal 30 to recognize the blinking pattern. However, the IP address of the portable terminal 30 and the shot image (video) may be transmitted as the connection request from the portable terminal 30 to the server 40. In the server 40, the analysis of the shot image and the recognition of the blinking pattern may be carried out, and in case that the blinking pattern which is coincident with the recognized blinking pattern is registered in the collation table 50, the connection setting may be carried out. In this case, when a plurality of image forming apparatuses 10 are in the shot image, the server 40 may notify the portable terminal 30 of the situation in which a plurality of image forming apparatuses 10 are in the shot image. Then, the portable terminal 30 may receive the selection operation for selecting one among the above image forming apparatuses 10 and may notify the server 40 of the selection result.

In this embodiment, the server 40 generates the blinking pattern which is unique to each image forming apparatus 10, and notifies the image forming apparatus 10 of the generated blinking pattern. Then, the image forming apparatus 10 blinks the light emitting unit 21 thereof in accordance with the above blinking pattern. However, the blinking pattern of each image forming apparatus 10 may be previously registered in each image forming apparatus 10. For example, an administrator may determine the blinking pattern of each image forming apparatus 10, and register the determined blinking pattern in each image forming apparatus 10.

In this embodiment, the image forming apparatus 10 starts the blinking of the light emitting unit 21 by receiving the blinking request from the server 40. However, the image forming apparatus 10 may determine the starting timing of the blinking operation of the light emitting unit 21 thereof. That is, when the image forming apparatus 10 is powered on or is communicable with the server 40, the image forming apparatus 10 starts the blinking operation of the light emitting unit 21.

In this embodiment, the job processing device is explained by exemplifying the image forming apparatus 10. However, in case that a device executes a job in accordance the instruction from the portable terminal 30, the above device may be used as the job processing device. Further, in this embodiment, the address on the network is the IP address. However, the address on the network is not limited to the address used in the Internet Protocol. The address on the network may be the address determined according to the used network.

Further, in this embodiment, when the server 40 receives a new connection request for connecting with the image forming apparatus 10 for which another connection setting has been already carried out, and the connection setting is carried out in accordance with the above new connection request, the terminal IP address corresponding to the above image forming apparatus 10 is overwritten to the IP address included in the new connection request. However, without deleting the terminal IP address used in the connection setting which has been already carried out, the IP address of the portable terminal, which is used in the new connection request can be added to the box of the terminal IP address. That is, the connecting setting can be carried out so as to relate a plurality of portable terminals to one image forming apparatus 10.

In the relay connection system 5, it is possible to divide one job and to instruct a plurality of image forming apparatuses 10 to execute the job. At this time, the combination (group) of the image forming apparatuses 10 for executing the job by dividing the job is previously registered. The combination of a plurality of image forming apparatuses 10 can be treated as one virtual image forming apparatus (virtual printer).

The virtual printer is stored as the information arranged in one horizontal row of the collation table 50 shown in FIG. 5. In this case, the virtual printer is actually configured by a plurality of image forming apparatuses 10. Therefore, with respect to the apparatus IP address, the blinking pattern, the blinking status, the apparatus status, and the like, the information corresponding to each of a plurality of image forming apparatuses 10 which constitute the virtual printer, is set. For example, each of MFP1 and MFP2 is registered as the independent (actual) image forming apparatus 10 as shown in FIG. 5. In addition, in MFP1 and MFP2, the virtual printer which is configured by MFP1 and MFP2 can be registered separately.

In this case, when only one image forming apparatus 10 of MFP1 and MFP2 is shot by the portable terminal 30, the connection request is one for carrying out the connection setting for setting the communication between the shot independent image forming apparatus 10 and the portable terminal 30. When the above connection request is carried out, the server 40 relays the communication between the shot independent image forming apparatus 10 and the portable terminal 30. On the other hand, when both of MFP1 and MFP2 are shot simultaneously or successively, the connection request is one for carrying out the connection setting for setting the communication between the combination of MFP1 and MFP2 as the virtual printer and the portable terminal 30. When the above connection request is carried out, the server 40 relays the communication between the combination of MFP1 and MFP2 as the virtual printer and the portable terminal 30.

In case that the communication is relayed between the combination of MFP1 and MFP2 as the virtual printer and the portable terminal 30, one job is divided into a plurality of division jobs and the division jobs are executed by MFP1 and MFP2, respectively. That is, one job is executed by a plurality of image forming apparatuses which are MFP1 and MFP2. At this time, in consideration of the performance, the job execution status, the remaining of the consumables and the like in each of MFP1 and MFP2, one job may be divided into a plurality of division jobs corresponding to MFP1 and MFP2, respectively. In case that a plurality of image forming apparatuses 10 are shot by the portable terminal 30, the relay connection system may enable a user to select whether the communication is relayed between one image forming apparatus 10 and the portable terminal 30 (one image forming apparatus 10 is selected) as explained in the above embodiment or whether the communication is relayed between the virtual printer which is configured by a plurality of shot image forming apparatuses and the portable terminal 30.

One of the objects of the above embodiment is to provide a relay connection system and a non-transitory computer-readable recording medium which can precisely identify the intended device by shooting the intended device apart from the intended device to a certain degree to establish and relay the communication between the devices.

In this embodiment, after the job processing device is powered on or after the job processing device is communicable with the server, the light emitting unit of the above job processing device blinks in accordance with a different blinking pattern from another job processing device. The terminal device analyzes the image obtained by shooting the job processing device using the image pickup unit to recognize the blinking pattern of the light emitting unit of the job processing device which exists in the image. Then, the terminal device transmits the connection request including the recognized blinking pattern and the address of the terminal device on the network, to the server. In the server, the blinking pattern of each job processing device (the blinking pattern of one job processing device is different from that of another job processing device) and the address of each job processing device on the network are previously registered so as to relate them. When the server receives the connection request from the terminal device, the server compares the blinking pattern included in the connection request with the registered blinking pattern. In case that the coincident blinking pattern is registered, the server carries out the connection setting in which the address of the terminal device on the network, which is included in the connection request is stored so as to relate the address of the terminal device on the network to the address of the job processing device on the network, which is registered so as to be related to the coincident blinking pattern. Then, the server relays the communication between the terminal device and the job processing device in which the address of the terminal device and the address of the job processing device are related by the valid connection setting. Thereby, it is possible to communicate between the terminal device and the job processing device without notifying the terminal device of the address of the job processing device on the network. Further, while a user is in the place apart from the job processing device by the distance at which the blinking of the light emitting unit can be shot, it is possible to communicate with the job processing device apart from the job processing device.

In this embodiment, after the job processing device is powered on or after the job processing device is communicable with the server, the light emitting unit of the above job processing device blinks in accordance with a different blinking pattern from another job processing device. The terminal device transmits the connection request including the image obtained by shooting the job processing device using the image pickup unit and the address of the terminal device on the network, to the server. In the server, the blinking pattern of each job processing device (the blinking pattern of one job processing device is different from that of another job processing device) and the address of each job processing device on the network are previously registered so as to relate them. When the server receives the connection request from the terminal device, the server recognizes the blinking pattern by analyzing the image included in the connection request, and compares the recognized blinking pattern with the registered blinking pattern. In case that the coincident blinking pattern is registered, the server carries out the connection setting in which the address of the terminal device on the network, which is included in the connection request is stored so as to relate the address of the terminal device on the network to the address of the job processing device on the network, which is registered so as to be related to the coincident blinking pattern. Then, the server relays the communication between the terminal device and the job processing device in which the address of the terminal device and the address of the job processing device are related by the valid connection setting. Thereby, it is possible to communicate between the terminal device and the job processing device without notifying the terminal device of the address of the job processing device on the network. Further, while a user is in the place apart from the job processing device by the distance at which the blinking of the light emitting unit can be shot, it is possible to communicate with the job processing device apart from the job processing device.

In this embodiment, the job processing device blinks the light emitting unit thereof in accordance with the blinking pattern included in the blinking request received from the server.

In this embodiment, the connection setting which is established by the connection request is automatically invalidated after the predetermined time elapses.

In this embodiment, in case that the blinking of each light emitting unit of a plurality of job processing devices is shot in the image, the selection of one job processing device among the above job processing devices is received from a user.

In this embodiment, when the job processing device receives the blinking request from the server, the job processing device starts the blinking operation of the light emitting unit.

In this embodiment, in the job processing device in which the number of times of the connection setting is not more than the threshold value, the blinking of the light emitting unit is limited.

In this embodiment, the job processing device which cannot execute the job does not blink the light emitting unit.

In this embodiment, the terminal device is notified whether the job processing device which is shot by the terminal device can execute the job, as the response to the connection request.

In this embodiment, the connection setting for setting the communication with the virtual job processing device which is configured by a plurality of job processing devices can be carried out. When the above connection setting is carried out, the communication between the terminal device and the virtual job processing device (actually, a plurality of job processing devices which constitute the virtual job processing device) is relayed.

In this embodiment, in case that all of the job processing devices which constitute the virtual job processing device are shot, the connection request is one for requesting the server to carry out the connection setting for relaying the communication between the terminal device and the virtual job processing device. In case that one or more job setting devices selected from the job processing devices which constitute the virtual job processing device, are shot, the connection request is one for requesting the server to carry out the connection setting for relaying the communication between the terminal device and one of the shot job processing devices.

According to the relay connection system and the non-transitory computer-readable recording medium, it is possible to precisely identify the intended device by shooting the intended device using the terminal device apart from the intended device to a certain degree to establish and relay the communication between the devices.

What is claimed is:

1. A relay connection system, comprising:
a server connected to a network;
one or more job processing devices connected to the network; and
a terminal device connected to the network,
wherein the server relays a communication between the terminal device and at least one of the job processing devices,
each of the job processing devices comprises a light emitting unit and blinks the light emitting unit in accordance with a different blinking pattern from another job processing device,
wherein the terminal device further comprises an image pickup unit;
the terminal device recognizes the blinking pattern of the light emitting unit of the job processing device by performing an image pick up of the job processing device with the image pickup unit, and transmits a connection request including the recognized blinking pattern and an address of the terminal device on the network, to the server,
the server registers an address of each job processing device on the network and the blinking pattern of each job processing device so as to relate the address of the job processing device to the blinking pattern of the job processing device,
in case that the server receives the connection request from the terminal device, the server checks whether a coincident blinking pattern which is coincident with the blinking pattern included in the connection request is registered, and
in case that the coincident blinking pattern is registered, the server carries out a connection setting in which the address of the terminal device on the network, which is included in the received connection request is stored so as to relate the address of the terminal device on the network to the address of the job processing device on the network, which is registered so as to be related to the coincident blinking pattern, and relays the communication between the terminal device and the job processing device in which the address of the terminal device and the address of the job processing device are related by the connection setting.

2. A relay connection system, comprising:
a server connected to a network;
one or more job processing devices connected to the network; and
a terminal device connected to the network,
wherein the server relays a communication between the terminal device and at least one of the job processing devices,
each of the job processing devices comprises a light emitting unit and blinks the light emitting unit in accordance with a different blinking pattern from another job processing device,
wherein the terminal device further comprises an image pickup unit;
the terminal device transmits a connection request including an image obtained by performing an image pickup of the blinking pattern of the light emitting unit of the job processing device with the image pickup unit and an address of the terminal device on the network, to the server,
the server registers an address of each job processing device on the network and the blinking pattern of each job processing device so as to relate the address of the job processing device to the blinking pattern of the job processing device,
in case that the server receives the connection request from the terminal device, the server recognizes the blinking pattern of the light emitting unit of the job processing device which exists in the image included in the connection request, and checks whether a coincident blinking pattern which is coincident with the recognized blinking pattern is registered, and
in case that the coincident blinking pattern is registered, the server carries out a connection setting in which the address of the terminal device on the network, which is included in the received connection request is stored so as to relate the address of the terminal device on the network to the address of the job processing device on the network, which is registered so as to be related to the coincident blinking pattern, and relays the communication between the terminal device and the job processing device in which the address of the terminal device and the address of the job processing device are related by the connection setting.

3. The relay connection system of claim 1, wherein the server registers the address of each of a plurality of job processing devices on the network and the blinking pattern of each of the plurality of job processing devices so as to relate the address of the job processing device to the blinking pattern of the job processing device.

4. The relay connection system of claim 1, wherein the server transmits the blinking pattern assigned to each job processing device, to the job processing device, and
the job processing device blinks the light emitting unit in accordance with the blinking pattern which is received from the server.

5. The relay connection system of claim 1, wherein the server invalidates the connection setting after a predetermined time elapses.

6. The relay connection system of claim 1, wherein when the server relays the communication, the server temporarily stores data received from a relay source in a relay data storing unit, and transmits the data to a relay destination by reading out the data from the relay data storing unit.

7. The relay connection system of claim 6, wherein the server enables the relay data storing unit to temporarily store a plurality of data, and transmits the data to the relay destination by sequentially reading out the data from the relay data storing unit in an order in which the data are temporarily stored.

8. The relay connection system of claim 1, wherein when a plurality of job processing devices in which the light emitting units blinks, are simultaneously picked up in the image pickup, the terminal device receives an operation for selecting one job processing device among the plurality of job processing devices from a user, and recognizes the blinking pattern of the light emitting unit of the selected job processing device.

9. The relay connection system of claim 1, wherein in case that the job processing device detects an abnormality of a blinking of the light emitting unit in the job processing device, the job processing device notifies the server of the abnormality of the blinking, and
the server which receives a notification indicating the abnormality of the blinking stores the abnormality of the blinking so as to relate the abnormality of the blinking to the job processing device which transmits the notification.

10. The relay connection system of claim 1, wherein when the job processing device is powered on or when the job processing device is communicable with the server via the network, the server transmits a blinking request for requesting the job processing device to blink the light emitting unit, and
the job processing device blinks the light emitting unit in accordance with the blinking request received from the server.

11. The relay connection system of claim 10, wherein the server counts number of times of the connection setting for each job processing device, and the server does not transmit the blinking request to the job processing device in which the number of times of the connection setting is not more than a predetermined threshold value, or transmits the blinking request for limiting a frequency of a blinking of the light emitting unit, to the job processing device in which the number of times of the connection setting is not more than the predetermined threshold value.

12. The relay connection system of claim 1, wherein the job processing device judges whether the job processing device can execute a job, and in case that the job processing cannot execute the job, the job processing device does not blink the light emitting unit in accordance with the blinking pattern.

13. The relay connection system of claim 1, wherein when the job processing device cannot execute a job, the job processing device transmits device information indicating a status of the job processing device, to the server,
the server stores the received device information so as to relate the device information to the address of the job processing device on the network, which transmits the device information, and
when the server receives the connection request, in case that the coincident blinking pattern which is coincident with the blinking pattern included in the connection request is registered and in case that the device information stored so as to relate the device information to the address of the job processing device on the network, which is related to the coincident blinking pattern, is registered, the server notifies the terminal device which transmits the connection request of the status of the job processing device, which is indicated in the device information.

14. The relay connection system of claim 9, wherein the terminal device obtains information indicating that the job processing device in which the light emitting unit does not blink in accordance with the blinking pattern exists, from the server and display the information.

15. The relay connection system of claim 1, wherein the terminal device is enabled to receive an instruction for forcedly blinking the light emitting unit from a user,
in case that the terminal device receives the instruction, the terminal device transmits a forced emitting instruction to the server,
the server which receives the forced emitting instruction transmits a forced emitting command for carrying out a blinking operation of the light emitting unit for a predetermined time to all of the job processing devices, and
each of the job processing devices which receive the forced emitting command blinks the light emitting unit in accordance with the blinking pattern for the predetermined time.

16. The relay connection system of claim 1, wherein a virtual job processing device which is configured by a plurality of job processing devices is set, and
the server relays the communication between the terminal device and the virtual job processing device by carrying out the connection setting for setting the communication with the virtual job processing device.

17. The relay connection system of claim 16, wherein in case that all of the job processing devices which blink the light emitting units in accordance with the respective blinking patterns and which constitute the virtual job processing device are picked up in the image pickup, the connection request is a request for carrying out the connection setting for setting the communication with the virtual job processing device, and
in case that one or more job setting devices selected from the job processing devices which blink the light emitting units in accordance with the respective blinking patterns and which constitute the virtual job processing device, are picked up in the image pickup, the connection request is a request for carrying out the connection setting for setting the communication with one of the job processing devices picked up in the image pickup.

18. A non-transitory computer-readable recording medium storing a program, wherein the program causes a server which is connected to a network to which one or more job processing devices are connected, each job processing device comprising a light emitting unit and blinking the light emitting unit in accordance with a different blinking pattern from another job processing device, to execute:

registering an address of each job processing device on the network and the blinking pattern of each job processing device so as to relate the address of the job processing device to the blinking pattern of the job processing device, wherein in case that the server receives a connection request including the blinking pattern recognized by a terminal device by performing an image pick up of the blinking pattern of the light emitting unit of the job processing device with an image pickup unit of the terminal device and an address of the terminal device on the network, from the terminal device via the network, the server checks whether a coincident blinking pattern which is coincident with the blinking pattern included in the connection request is registered, in case that the coincident blinking pattern is registered, the server carries out a connection setting in which the address of the terminal device on the network, which is included in the received connection request is stored so as to relate the address of the terminal device on the network to the address of the job processing device on the network, which is registered so as to be related to the coincident blinking pattern, and the server relays a communication between the terminal device and the job processing device in which the address of the terminal device and the address of the job processing device are related by the connection setting.

19. A non-transitory computer-readable recording medium storing a program, wherein the program causes a server which is connected to a network to which one or more job processing devices are connected, each job processing device comprising a light emitting unit and blinking the light emitting unit in accordance with a different blinking pattern from another job processing device, to execute:

registering an address of each job processing device on the network and the blinking pattern of each job processing device so as to relate the address of the job processing device to the blinking pattern of the job processing device, wherein in case that the server receives a connection request including an image obtained from a terminal device by performing an image pickup of the blinking pattern of the light emitting unit of the job processing device with an image pickup unit of the terminal device and an address of the terminal device on the network, which transmits the connection request to the server via the network, from the terminal device, the server recognizes the blinking pattern of the light emitting unit of the job processing device which exists in the image included in the connection request, and checks whether a coincident blinking pattern which is coincident with the recognized blinking pattern is registered, in case that the coincident blinking pattern is registered, the server carries out a connection setting in which the address of the terminal device on the network, which is included in the received connection request is stored so as to relate the address of the terminal device on the network to the address of the job processing device on the network, which is registered so as to be related to the coincident blinking pattern, and the server relays a communication between the terminal device and the job processing device in which the address of the terminal device and the address of the job processing device are related by the connection setting.

20. The non-transitory computer-readable recording medium of claim 18, wherein the program causes the server to register the address of each of a plurality of job processing devices on the network and the blinking pattern of each of the plurality of job processing devices so as to relate the address of the job processing device to the blinking pattern of the job processing device.

21. The non-transitory computer-readable recording medium of claim 18, wherein the job processing device blinks the light emitting unit in accordance with the blinking pattern which is received from the server, and the program causes the server to transmit the blinking pattern assigned to each job processing device, to the job processing device.

22. The non-transitory computer-readable recording medium of claim 18, wherein the program causes the server to invalidate the connection setting after a predetermined time elapses.

23. The non-transitory computer-readable recording medium of claim 18, wherein when the server relays the communication, the program causes the server to temporarily store data received from a relay source in a relay data storing unit, and transmit the data to a relay destination by reading out the data from the relay data storing unit.

24. The non-transitory computer-readable recording medium of claim 23, wherein server enables the relay data storing unit to temporarily store a plurality of data, and the program causes the server to transmit the data to the relay destination by sequentially reading out the data from the relay data storing unit in an order in which the data are temporarily stored.

25. The non-transitory computer-readable recording medium of claim 18, wherein when a plurality of job processing devices in which the light emitting units blinks, are simultaneously picked up in the image pickup, the terminal device receives an operation for selecting one job processing device among the plurality of job processing devices from a user, and the program causes the server to check whether the coincident blinking pattern which is coincident with the blinking pattern of the light emitting unit of the selected job processing device is registered.

26. The non-transitory computer-readable recording medium of claim 18, wherein in case that the server receives a notification indicating an abnormality of a blinking of the light emitting unit, from the job processing unit, the program causes the server to store the abnormality of the blinking so as to relate the abnormality of the blinking to the job processing device which transmits the notification.

27. The non-transitory computer-readable recording medium of claim 18, wherein the job processing device blinks the light emitting unit in accordance with a blinking request received from the server, and when the job processing device is powered on or when the job processing device is communicable with the server via the network, the program causes the server to transmit the blinking request to the job processing device.

28. The non-transitory computer-readable recording medium of claim 27, wherein the program causes the server to count number of times of the connection setting for each job processing device, and causes the server to not transmit the blinking request to the job processing device in which the number of times of the connection setting is not more than a predetermined threshold value, or to transmit the blinking request for limiting a frequency of a blinking of the light emitting unit, to the job processing device in which the number of times of the connection setting is not more than the predetermined threshold value.

29. The non-transitory computer-readable recording medium of claim 18, wherein in case that the server receives device information indicating a status of the job processing device from the job processing device which cannot execute a job, the program causes the server to store the received device information so as to relate the device information to the address of the job processing device on the network, which transmits the device information, and when the server receives the connection request, in case that the coincident blinking pattern which is coincident with the blinking pattern included in the connection request is registered and in case that the device information stored so as to relate the device information to the address of the job processing device on the network, which is related to the coincident blinking pattern, is registered, the program causes the server to notify the terminal device which transmits the connection request of the status of the job processing device, which is indicated in the device information.

30. The non-transitory computer-readable recording medium of claim 26, wherein the program causes the server to transmit information indicating that the job processing device in which the light emitting unit does not blink in accordance with the blinking pattern exists, to the terminal device and to instruct the terminal device to display the information.

31. The non-transitory computer-readable recording medium of claim 18, wherein in case that the server receives a forced emitting instruction which is transmitted to the server by the terminal device which receives an instruction for forcedly blinking the light emitting unit from a user, the program causes the server to transmit a forced emitting command for carrying out a blinking operation of the light emitting unit for a predetermined time to all of the job processing devices.

32. The non-transitory computer-readable recording medium of claim 18, wherein the program causes the server to set a virtual job processing device which is configured by a plurality of job processing devices, and to relay the communication between the terminal device and the virtual job processing device by carrying out the connection setting for setting the communication with the virtual job processing device.

33. The non-transitory computer-readable recording medium of claim 32, wherein in case that all of the job processing devices which blink the light emitting units in accordance with the respective blinking patterns and which constitute the virtual job processing device are picked up in the image pickup, the connection request is a request for carrying out the connection setting for setting the communication with the virtual job processing device, and in case that one or more job setting devices selected from the job processing devices which blink the light emitting units in accordance with the respective blinking patterns and which constitute the virtual job processing device, are picked up in the image pickup, the connection request is a request for carrying out the connection setting for setting the communication with one of the job processing devices picked up in the image pickup.

* * * * *